US011097923B2

(12) United States Patent
Eleid et al.

(10) Patent No.: US 11,097,923 B2
(45) Date of Patent: Aug. 24, 2021

(54) SYSTEMS AND METHODS FOR ACTIVELY MONITORING AND CONTROLLING LIFT DEVICES

(71) Applicant: Xicore Inc., Mississauga (CA)

(72) Inventors: Ray Eleid, Mississauga (CA); Fransky Halim, Mississauga (CA); Thomas Sternberg, Delta (CA)

(73) Assignee: Xicore Inc., Mississauga (CA)

( * ) Notice: Subject to any disclaimer, the term of this patent is extended or adjusted under 35 U.S.C. 154(b) by 684 days.

(21) Appl. No.: 15/662,227

(22) Filed: Jul. 27, 2017

(65) Prior Publication Data

US 2017/0355554 A1 Dec. 14, 2017

Related U.S. Application Data

(63) Continuation-in-part of application No. 15/049,336, filed on Feb. 22, 2016, now Pat. No. 9,767,441, which
(Continued)

(51) Int. Cl.
*B66B 1/28* (2006.01)
*B66B 1/34* (2006.01)
(Continued)

(52) U.S. Cl.
CPC .......... *B66B 1/3446* (2013.01); *B66B 1/2458* (2013.01); *B66B 1/28* (2013.01);
(Continued)

(58) Field of Classification Search
CPC ....... B66B 1/3446; B66B 1/2458; B66B 1/28; B66B 1/3461; B66B 3/002; B66B 25/00;
(Continued)

(56) References Cited

U.S. PATENT DOCUMENTS 3,973,648 A * 8/1976 Hummert .............. B66B 5/0006 187/393
4,512,442 A * 4/1985 Moore .................. B66B 5/0006 187/393
(Continued)

FOREIGN PATENT DOCUMENTS

CA 2447967 A1 5/2004
CA 2932988 A1 6/2015
(Continued)

*Primary Examiner* — Christopher Uhlir
(74) *Attorney, Agent, or Firm* — Blake, Cassels & Graydon LLP; Laurie Wright; Christopher N. Hunter

(57) ABSTRACT

Typically a technician is physically present to investigate a malfunction of an elevator system. Devices, systems and methods are provided for actively monitoring one or more lift devices, such as elevators and escalators. A computing system for electrically controlling an elevator controller, includes: a field board electrically connected to an elevator controller, and the field board communicates with a computing platform device, which in turn is connected to a server over the Internet. The field board includes relay switches that are electrically connected to the elevator controller. The server sends poking commands that triggers a relay switch to open or close, which causes the elevator controller to generate a call signal to move the elevator to an upper or a lower floor. If the elevator does not move according to a poking command, then a malfunction is reported.

21 Claims, 37 Drawing Sheets

Related U.S. Application Data is a continuation-in-part of application No. 14/514, 260, filed on Oct. 14, 2014, now Pat. No. 9,747,585.

(51) Int. Cl.

| | |
|---|---|
| ***G05B 15/02*** | (2006.01) |
| ***B66B 25/00*** | (2006.01) |
| ***B66B 1/24*** | (2006.01) |
| ***B66B 3/00*** | (2006.01) |
| ***G06F 3/0484*** | (2013.01) |
| ***G06Q 10/00*** | (2012.01) |

(52) U.S. Cl.

CPC ............ *B66B 1/3461* (2013.01); *B66B 3/002* (2013.01); *B66B 25/00* (2013.01); *G05B 15/02* (2013.01); *G06F 3/0484* (2013.01); *G06Q 10/00* (2013.01); *G06Q 10/20* (2013.01)

(58) Field of Classification Search

CPC ... B66B 1/3415; B66B 1/3423; B66B 1/2446; B66B 1/3453; B66B 5/0018; G05B 15/02

USPC ......... 187/247, 248, 391–396; 340/502, 503, 340/514–516, 539.1, 539.11, 539.14, 3.1; 706/909, 910, 918

See application file for complete search history.

(56) References Cited

U.S. PATENT DOCUMENTS

| | | | | |
|---|---|---|---|---|
| 4,568,909 | A * | 2/1986 | Whynacht | B66B 5/0006 187/393 |
| 4,823,914 | A * | 4/1989 | McKinney | B66B 5/0006 187/393 |
| 4,898,263 | A * | 2/1990 | Manske | B66B 5/0087 187/247 |
| 5,010,472 | A * | 4/1991 | Yoneda | B66B 1/18 187/391 |
| 5,884,035 | A | 3/1999 | Butman | |
| 6,253,879 | B1 | 7/2001 | Skalski et al. | |
| 6,330,936 | B1 | 12/2001 | Lence Barreiro | |
| 6,484,849 | B2 | 11/2002 | Vecchiotti et al. | |
| 6,863,161 | B2 * | 3/2005 | Mearns | B66B 5/0006 187/247 |
| 6,971,480 | B2 * | 12/2005 | Trifu | B66B 3/00 187/247 |
| 7,073,633 | B2 * | 7/2006 | Weinberger | B66B 5/0025 187/393 |
| 7,417,726 | B2 | 8/2008 | Kao | |
| 9,064,219 | B2 | 6/2015 | Hall | |
| 9,580,276 | B2 * | 2/2017 | Toutaoui | B66B 1/3461 |
| 9,734,003 | B2 * | 8/2017 | Sekine | B66B 5/0006 |
| 9,747,585 | B2 * | 8/2017 | Eleid | G06Q 10/20 |
| 9,767,441 | B2 * | 9/2017 | Eleid | G06Q 10/20 |
| 10,112,801 | B2 * | 10/2018 | Madarasz | B66B 5/0037 |
| 10,723,587 | B2 * | 7/2020 | Hattori | B66B 5/0018 |
| 2004/0193518 | A1 | 9/2004 | Deplazes | |
| 2010/0058248 | A1 | 3/2010 | Park | |
| 2010/0286937 | A1 | 5/2010 | Hedley | |
| 2012/0072356 | A1 | 3/2012 | Welty | |
| 2013/0001023 | A1 | 1/2013 | Leutenegger et al. | |
| 2013/0073260 | A1 | 3/2013 | Maeda | |
| 2013/0173062 | A1 | 7/2013 | Koenig-Richardson | |
| 2014/0229335 | A1 | 8/2014 | Chen | |
| 2016/0010313 | A1 | 1/2016 | Sugiura | |
| 2016/0012707 | A1 | 1/2016 | McKinley | |
| 2016/0104126 | A1 | 4/2016 | Elied | |
| 2016/0355376 | A1 | 12/2016 | Sonnenmoser et al. | |

FOREIGN PATENT DOCUMENTS

| | | | |
|---|---|---|---|
| CN | 103601048 | A | 2/2014 |
| DE | 20307951 | U1 | 8/2003 |
| JP | 02198991 | A | 8/1990 |
| JP | 02286584 | A | 11/1990 |
| WO | 03066497 | A1 | 8/2003 |
| WO | 2006048498 | A1 | 5/2006 |
| WO | 2016116146 | A1 | 7/2016 |

* cited by examiner

3-3_activities

| Column Name | Ref. | Data Type |
|---|---|---|
| activity_id | 102 | int |
| company_id | 104 | int |
| location_id | 106 | int |
| device_id | 108 | int |
| activity_type | | varchar(30) |
| work_description | 110 | varchar(250) |
| repair_description | 112 | varchar(250) |
| entered_date | 114 | smalldatetime |
| completed_date | 116 | smalldatetime |
| work_order_number | | varchar(20) |
| invoice_number | 120 | varchar(20) |
| estimated_cost | 122 | decimal(10,... |
| actual_cost | 124 | decimal(10,... |
| callback_id | 123 | int |
| directive_code | 125 | varchar(10) |
| deficiency_number | 126 | varchar(20) |
| government_mandated_code | 127 | varchar(10) |
| counter | 128 | int |
| billable | 129 | bit |
| deleted | | bit |
| deleted_by | | int |
| deleted_when | | smalldatetime |
| timeID | | int |
| ContractID | | int |

FIG. 18a

3-3_activity_labour

| Ref. | Column Name | Ref. | Data Type |
|---|---|---|---|
| 130 | activity_labour_id | | int |
| | activity_id | 102 | int |
| | mechanic | 132 | varchar(50) |
| 134 | time_ticket_number | | varchar(20) |
| | mechanic_rank | | varchar(10) |
| 136 | bill_regular_hour | | decimal(6, 2) |
| 136 | bill_half_hour | | decimal(6, 2) |
| 136 | bill_overtime_hour | | decimal(6, 2) |
| 136 | bill_travel_time | | decimal(6, 2) |
| 138 | nonbill_regular_hour | | decimal(8, 1) |
| 138 | nonbill_half_hour | | decimal(8, 1) |
| 138 | nonbill_overtime_h... | | decimal(8, 1) |
| 138 | nonbill_travel_time | | decimal(8, 1) |
| | activity_performed | | varchar(250) |

FIG. 18b

3-3_activity_parts

| Ref. | Column Name | Ref. | Data Type |
|---|---|---|---|
| 140 | activity_part_id | | int |
| 130 | activity_labour_id | | int |
| 102 | activity_id | | int |
| | SKU | 142 | varchar(30) |
| | OEM | 144 | varchar(30) |
| | non_OEM | | varchar(30) |
| | name | 146 | varchar(50) |
| 148 | manufacturer | | varchar(50) |
| 150 | quantity | | smallint |
| 152 | description | | varchar(100) |
| | billable | | bit |
| | price | 154 | decimal(8, 2) |

FIG. 18c

3-5_callbacks

| Column Name | Data Type |
|---|---|
| callback_id —— 156 | int |
| device_id —— 158 | int |
| solucore_call_code - 160 | varchar(10) |
| call_code —— 162 | varchar(10) |
| company_callback_id 164 | varchar(20) |
| company_id —— 166 | int |
| entered_by ⎫ 168 | int |
| entered_from ⎭ | char(1) |
| date_the_problem_occurred | smalldateti... |
| call_description ⎫ | varchar(250) |
| call_time ⎭ 169 | smalldateti... |
| reported_by | varchar(50) |
| call_status | varchar(20) |
| call_close_time | varchar(10) |
| call_close_date | smalldateti... |
| entrapment | bit |
| dispatch_time —— 170 | smalldateti... |
| mechanic_arrive_time 172 | smalldateti... |
| billable_original —— 174 | bit |
| billable_current | bit |
| car_running | bit |
| updated_by ⎫ 176 | int |
| updated_when ⎭ | smalldateti... |
| mapped_to | int |
| deleted | bit |
| counter | int |
| ContractID | int |
| EmergencyType | nvarchar(50) |

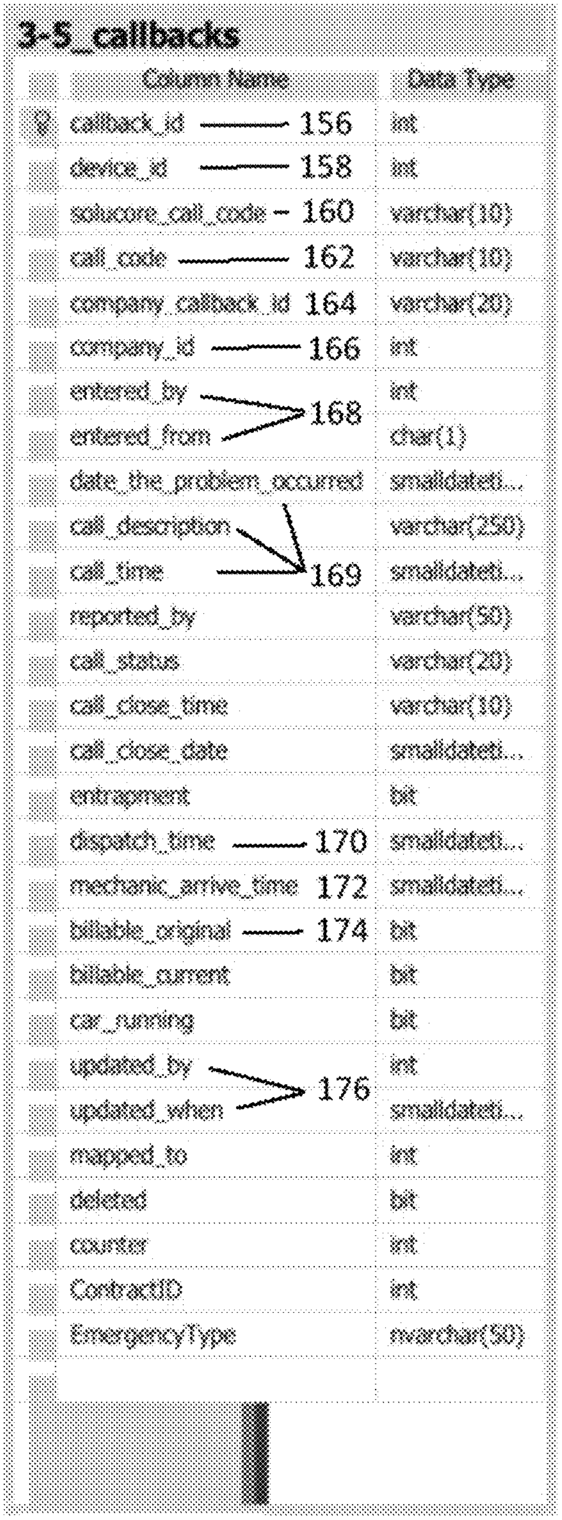

FIG. 19a

3-5_callbackTime

| Column Name | Data Type |
|---|---|
| 178 — timeID | int |
| 156 — callback_id | int |
| 170 — dispatch_time | smalldatetime |
| 172 — mechanic_arrive_ti... | smalldatetime |
| 180 — checked | int |
| note | nvarchar(250) |

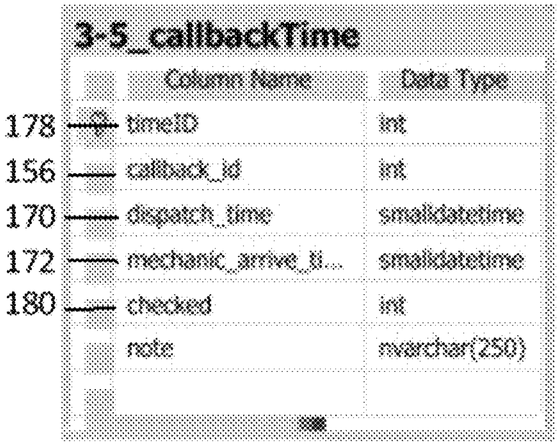

FIG. 19b

3-4_callCodes

| Column Name | Data Type |
|---|---|
| 162 — call_code | varchar(10) |
| 160 — solucore_call_code | varchar(4) |
| 166 — company_id | int |
| 182 — part_name | varchar(100) |
| id | int |

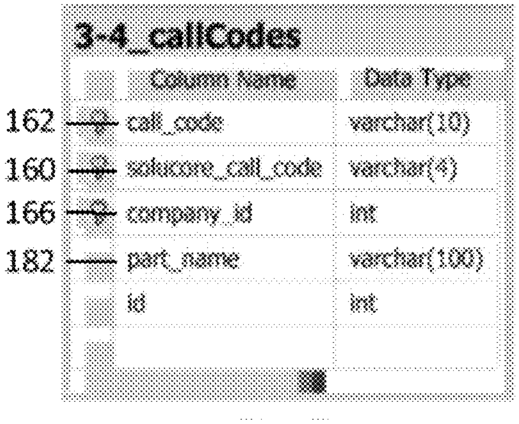

FIG. 19c

Sample of XML string being transmitted

```
<ArrayOfEventInfo xmlns:xsi="http://www.w3.org/2001/XMLSchema-instance"
xmlns:xsd="http://www.w3.org/2001/XMLSchema"
xmlns="http://www.mceinc.com/webservices/">
  <EventInfo>
185 <buildingid>1</buildingid>
186 <rowid>112545</rowid>
187 <manufacturerid>8</manufacturerid>
188 <dipatcherid>3</dispatcherid>
189 <carid>11</carid>
190 <car>North Parking</car>
192 <carid>11</carid>
193 <date>2014-05-11T16:04:59.33</date>
194 <EventId>805339135</EventId>
195 <floor>P3</floor>
196 <floorid>3</floorid>
    <confirmed>false</confirmed>
    <comment/>
  </EventInfo>
</ArrayOfEventInfo>
```

FIG. 20a

Data conversion

| Entity from XML string | Data Column in BuildingEvents table |
|---|---|
| buildingid | BuildingId |
| rowid | RowId |
| manufacturerid | ManufacturerId |
| dipatcherid | DispatcherId |
| carid | CarId |
| date | EventDate |
| eventId | EventId |
| floorid | FloorId |
| comment | Comment |

FIG. 20b

Building events table

BuildingEvents

| Column Name | Data Type |
|---|---|
| BuildingId | int |
| RowId | bigint |
| DispatcherId | int |
| CarId | smallint |
| FloorId | smallint |
| EventDate | smalldatetime |
| ManufacturerId | int |
| EventId | bigint |
| Comment | nvarchar(255) |

FIG. 20c

| Day | Critical Hours - 1 | Critical Hours - 2 | Critical Hours - 3 |
|---|---|---|---|
| Mon | 7:00 AM - 9:00 PM | | |
| Tue | 7:00 AM - 9:00 PM | | |
| Wed | 7:00 AM - 9:00 PM | | |
| Thu | 7:00 AM - 9:00 PM | | |
| Fri | 7:00 AM - 9:00 PM | | |
| Sat | 12:00 PM - 5:00 PM | | |
| Sun | 12:00 PM - 5:00 PM | | |

| Call Code | Total |
|---|---|
| ELE - Electrical system | 9 |
| GOV - Governor / Safety | 6 |
| DRV - Drive & Starter | 5 |
| BRA - Brake | 5 |
| CON - Controller electrical | 13 |
| FIX - Fixtures | 4 |
| DOP - Door operator | 1 |
| CDR - Car door | 2 |

| Call Code | Total |
|---|---|
| PCB - Printed Circuit Boards | 16 |
| ROL - Roller guides, guide shoes | 5 |
| UND - Undefined | 9 |
| OTH - Other non component related | 5 |
| HES - Hoistway Electrical System | 3 |
| HDR - Hoistway Door | 2 |
| REL - Relay | 2 |
| MIS - Misuse of equipment | 2 |
| LEV - Landing system | 1 |

FIG. 27

| Callback Date | Completed Date | Entrapment (Yes/No) | Estimated DownTime | Callback Description | Repair Description |
|---|---|---|---|---|---|
| ⊟ Contractor2 | | | | | |
| H1 #E001 | Total Call backs: 6 | | | | |
| ELE - Electrical system - 3 call(s) | | | | | |
| 02/09/2015 07:56 PM | 2/10/2015 12:37:00 PM | No | 6 hours 41 minutes | ELV 51, STK ON GRND FLR, DRS OPN, NO LIGHTS, NT RESPONDING, RTCB TUESDAY AM | CAR - LIGHT (TROUBLESHOOT) |
| 06/22/2015 02:56 AM | 6/22/2015 7:37:00 PM | No | 12 hours 37 minutes | ELV 51, STK ON GRND FLR, DRS OPN, NO LIGHTS, NT RESPONDING, RTCB TUESDAY AM | CAR - LIGHT (TROUBLESHOOT) |
| 10/25/2015 03:56 AM | 10/25/2015 8:37:00 PM | No | 5 hours | ELV 51, STK ON GRND FLR, DRS OPN, NO LIGHTS, NT RESPONDING, RTCB TUESDAY AM | CAR - LIGHT (TROUBLESHOOT) |
| GOV - Governor / Safety - 3 call(s) | | | | | |
| 03/16/2015 03:06 PM | 3/16/2015 7:59:00 PM | No | 4 hours 53 minutes | ELV #42 -- MKG SCRAPING NOISE,STL IN SVC ---RTCB TDY----- | HOISTWAY - COUNTERWEIGHT GUIDES (CHECKED) |
| 07/27/2015 10:06 PM | 7/28/2015 2:58:00 AM | No | | ELV #42 -- MKG SCRAPING NOISE,STL IN SVC ---RTCB TDY----- | HOISTWAY - COUNTERWEIGHT GUIDES (CHECKED) |
| 11/29/2015 11:06 PM | 11/30/2015 3:59:00 AM | No | | ELV #42 -- MKG SCRAPING NOISE,STL IN SVC ---RTCB TDY----- | HOISTWAY - COUNTERWEIGHT GUIDES (CHECKED) |
| H4 #E004 | Total Call backs: 7 | | | | |
| DRV - Drive & Starter - 1 call(s) | | | | | |
| 01/03/2015 10:18 PM | 1/4/2015 12:34:00 AM | No | | ELV 43, STK ON 13, NO PASS==RTCB==ETA NDD PLS RUSH --CUST CLD BK, PASS NOW STK, MADE NEW EMG CL-- | CAR CONTROLLER - DIRECT DRIVE/STARTER/REGULAT (ADJUSTED) |
| PCB - Printed Circuit Boards - 2 call(s) | | | | | |
| 01/04/2015 02:19 AM | 1/4/2015 4:30:00 AM | Yes | | *EMERGENCY& ELV 43 STK ON UNKNOWN FLR WITH TRAPPED PASS - ETA NDD- | CAR CONTROLLER - PC BOARD, PROCESSOR (REPAIRED) |
| 06/05/2015 09:24 AM | 6/5/2015 10:25:00 PM | No | 11 hours 36 minutes | ELV 43,STK 15TH FLR,DRS CLSD,NO PASS.AM SVC PLS.RTCB-MONDAY | CAR CONTROLLER - PC BOARD, PROCESSOR (RESET / POR) |
| BRA - Brake - 1 call(s) | | | | | |
| 01/04/2015 07:38 PM | 1/4/2015 10:19:00 PM | No | | ELV #43,STK ON GRND,DRS OPN--RTCB-- | MAIN MACHINE - BRAKE (CLEAN AND ADJUSTED) |
| CON - Controller electrical - 1 call(s) | | | | | |
| 05/02/2015 02:42 AM | 5/2/2015 6:15:00 AM | Yes | | *EMERGENCY* ELV 43, STK ON 19TH FLR, 5 PEOPLE TRAPPED | CAR CONTROLLER - RESISTOR (TROUBLESHOOT) |

FIG. 28

```
<?xml version="1.0" encoding="UTF-16"?>
<CallBacksObject xmlns:xsd="http://www.w3.org/2001/XMLSchema"
xmlns:xsi="http://www.w3.org/2001/XMLSchema-instance">
  - <CallBacks xmlns="urn:evolve:services">
    - <CallBack>
          <ContractID>61</ContractID>
          <GovernmentInstallationNumber>85759</GovernmentInstallationNumber>
          <DateTheProblemOccurred>2014-08-12T00:36:00</DateTheProblemOccurred>
          <CallCode>B99</CallCode>
          <CallBackDescription>(B99-ZC1) SOUTH ESC 2 OOS MAKING LOUD NOISE
              C/B/C JOEL INFORM FT ALREADY ON SITE</CallBackDescription>
          <CallBackTime>2014-08-12T00:36:00</CallBackTime>
          <CallBackReporterName>JOEL - SEC @ 4169612311</CallBackReporterName>
          <CallBackStatus>Completed</CallBackStatus>
          <CallBackClosedDate>2014-08-12T14:41:00</CallBackClosedDate>
          <Entrapment>false</Entrapment>
          <DispatchTime>2014-08-12T00:41:06</DispatchTime>
          <MechanicArrivedTime>2014-08-12T14:45:00</MechanicArrivedTime>
          <RepairDescription>BUZZER ON SIDE OF UNIT MAKING NOISE HAD TO TAPE
              IT UP.</RepairDescription>
          <CompletedDate>2014-08-12T14:41:00</CompletedDate>
          <WorkOrderNumber/>
          <InvoiceNumber/>
          <EstimatedCost>0</EstimatedCost>
          <ActualCost>0</ActualCost>
          <DirectiveCode/>
          <DeficiencyNumber/>
          <GovernmentMandatedCode/>
          <Counter>0</Counter>
          <IsBillable>false</IsBillable>
          <Labours>
            - <Labour>
                  <MechanicName>SCOTT GLENN</MechanicName>
                  <TicketNumber/>
                  <MechanicRank/>
                  <RegularWorkingHour>0</RegularWorkingHour>
                  <TimeAndHalfWorkingHour>0</TimeAndHalfWorkingHour>
                  <OvertimeWorkingHour>0</OvertimeWorkingHour>
                  <TravelTime>0</TravelTime>
                - <Parts>
                    - <Part>
                          <SKU/>
                          <OEM/>
                          <NonOEM/>
                          <PartName>Labour</PartName>
                          <Manufacturer/>
                          <Quantity>1</Quantity>
                          <Description/>
                          <Price>0</Price>
```

FIG. 29a

```xml
            </Part>
          <Part>
              <SKU/>
              <OEM/>
              <NonOEM/>
              <PartName>Tape</PartName>
              <Manufacturer/>
              <Quantity>1</Quantity>
              <Description/>
              <Price>50</Price>
          </Part>
        </Parts>
      </Labour>
    </Labours>
  </CallBack>
  <CallBack>
      <ContractID>61</ContractID>
      <GovernmentInstallationNumber>85761</GovernmentInstallationNumber>
      <DateTheProblemOccurred>2014-08-29T00:59:00</DateTheProblemOccurred>
      <CallCode>B93</CallCode>
      <CallBackDescription>(B93-ZC1) FRI AM-ESC S4-OOS-SHOWING ERR ON
          SCREEN FT GLENN VERF HE RTS THIS AM / INCORRECTLY UPDTED
          ETA</CallBackDescription>
      <CallBackTime>2014-08-29T00:59:00</CallBackTime>
      <CallBackReporterName>SHAMEKA - SEC @ 4169612311</CallBackReporterName>
      <CallBackStatus>Completed</CallBackStatus>
      <CallBackClosedDate>2014-08-29T00:18:00</CallBackClosedDate>
      <Entrapment>false</Entrapment>
      <DispatchTime>2014-08-29T06:27:00</DispatchTime>
      <MechanicArrivalTime>2014-08-29T13:37:00</MechanicArrivalTime>
      <RepairDescription>HANDRAIL SENSOR TRIPPED RESET AND PUT UNIT BACK
          IN SERVICE</RepairDescription>
      <CompletedDate>2014-08-29T00:18:00</CompletedDate>
      <WorkOrderNumber/>
      <InvoiceNumber/>
      <EstimatedCost>0</EstimatedCost>
      <ActualCost>0</ActualCost>
      <DirectiveCode/>
      <DeficiencyNumber/>
      <GovernmentMandatedCode/>
      <Number>4</Number>
      <IsBillable>false</IsBillable>
      <Labours>
        <Labour>
            <MechanicName>SCOTT GLENN</MechanicName>
            <TicketNumber/>
            <MechanicRank/>
            <RegularWorkingHour>0</RegularWorkingHour>
            <TimeAndHalfWorkingHour>0</TimeAndHalfWorkingHour>
```

FIG. 29b

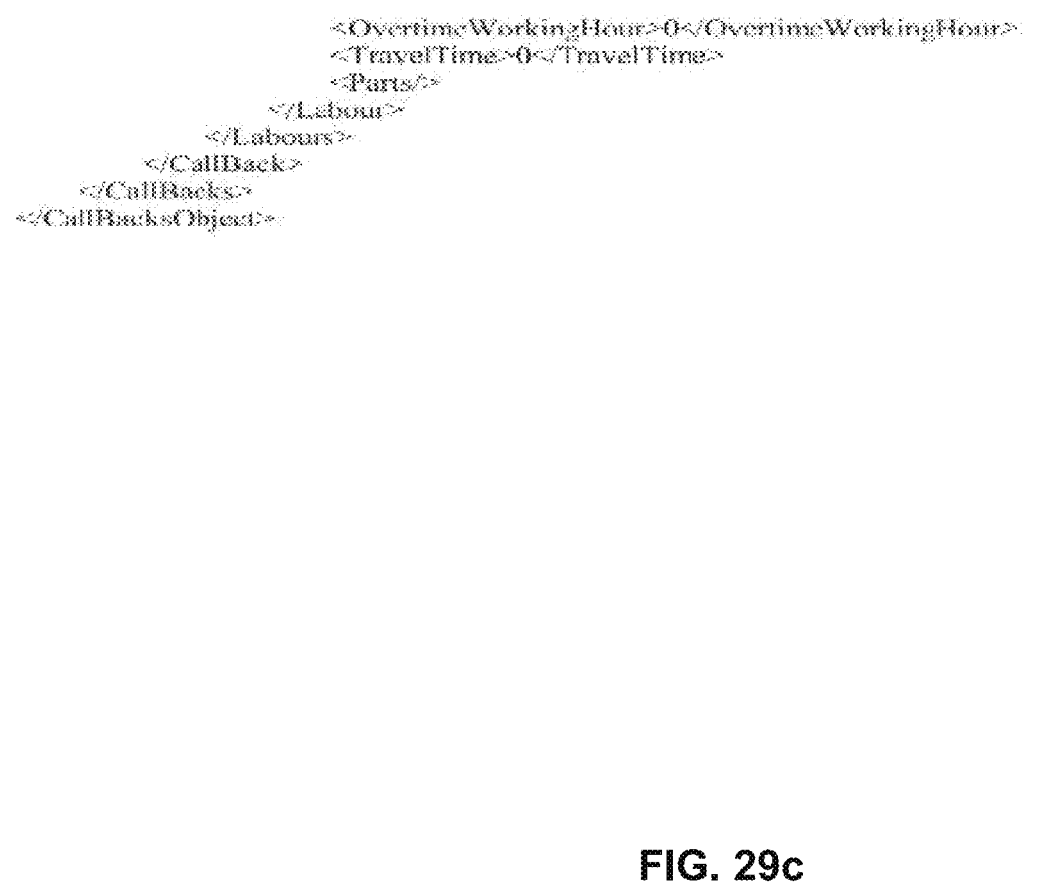

<OvertimeWorkingHour>0</OvertimeWorkingHour>
<TravelTime>0</TravelTime>
<Parts/>
</Labour>
</Labours>
</CallBack>
</CallBacks>
</CallBacksObject>

FIG. 29c

```
<?xml version="1.0" encoding="UTF-8"?>
<ArrayOfTask xmlns:xsi="http://www.w3.org/2001/XMLSchema-instance"
xmlns:xsd="http://www.w3.org/2001/XMLSchema">
 - <Task>
        <TaskID>650275</TaskID>
        <PreviousTaskID/>
        <TaskType>Maintenance</TaskType>
        <Billable>false</Billable>
        <InvoiceNumber/>
        <InvoiceAmount>0</InvoiceAmount>
        <BuildingID>522791</BuildingID>
        <ProvinceCode>ON</ProvinceCode>
        <BuildingName>QUEENSTON MEDICAL DENTAL CNTRE (38THE008-D00114)
            </BuildingName>
        <CallerName/>
        <CallerPhone/>
        <CreationDate>7/3/2014 7:00:00 AM</CreationDate>
        <DispatchedDate/>
        <ArrivalDate/>
        <ClearedDate>8/19/2014 5:41:43 PM</ClearedDate>
        <CustomerIssue>(Customer Not Available)</CustomerIssue>
        <MechanicName>Alovetdinov, Timur</MechanicName>
        <MechanicComments>maintenance.</MechanicComments>
        <Status>Approved</Status>
        <StatusNotes/>
      - <Problems>
          - <Problem>
                <TaskID>650275</TaskID>
                <ProblemLineNumber>1</ProblemLineNumber>
                <AHJNumber>67227</AHJNumber>
                <Entrapment>false</Entrapment>
                <DownTime>0</DownTime>
                <ProblemID>HYD-MANDATORY</ProblemID>
                <ProblemComments>VISIT 3 OF 4</ProblemComments>
                <ResolutionCode>CM</ResolutionCode>
                <ResolutionDescription>Completed Maintenance</ResolutionDescription>
              - <CheckListItems>
                  - <CheckListItem>
                        <TaskID>650275</TaskID>
                        <ProblemLineNumber>1</ProblemLineNumber>
                        <CheckListID>1</CheckListID>
                        <CheckListDescription>HWY</CheckListDescription>
                    </CheckListItem>
                  - <CheckListItem>
                        <TaskID>650275</TaskID>
                        <ProblemLineNumber>1</ProblemLineNumber>
                        <CheckListID>2</CheckListID>
                        <CheckListDescription>MR</CheckListDescription>
                    </CheckListItem>
```

FIG. 30a

- <CheckListItem>
<TaskID>650275</TaskID>
<ProblemLineNumber>1</ProblemLineNumber>
<CheckListID>3</CheckListID>
<CheckListDescription>DAG</CheckListDescription>
</CheckListItem>
- <CheckListItem>
<TaskID>650275</TaskID>
<ProblemLineNumber>1</ProblemLineNumber>
<CheckListID>4</CheckListID>
<CheckListDescription>TOC</CheckListDescription>
</CheckListItem>
- <CheckListItem>
<TaskID>650275</TaskID>
<ProblemLineNumber>1</ProblemLineNumber>
<CheckListID>5</CheckListID>
<CheckListDescription>PIT</CheckListDescription>
</CheckListItem>
</CheckListItems>
</Problem>
</Problems>
- <Debriefs>
- <Debrief>
<TaskID>650275</TaskID>
<DebriefType>LBR</DebriefType>
<DebriefCode>B</DebriefCode>
<Quantity>2</Quantity>
<RegularWorkingHour>0</RegularWorkingHour>
<TimeAndHalfWorkingHour>0</TimeAndHalfWorkingHour>
<OvertimeWorkingHour>0</OvertimeWorkingHour>
<TravelTime>0</TravelTime>
</Debrief>
</Debriefs>
</Task>
- <Task>
<TaskID>802327</TaskID>
<PreviousTaskID/>
<TaskType>Callback</TaskType>
<Billable>true</Billable>
<InvoiceNumber/>
<InvoiceAmount>0</InvoiceAmount>
<BuildingID>507824</BuildingID>
<ProvinceCode>ON</ProvinceCode>
<BuildingName>MRS. CAMERON MONTROSE APTS. (24WIN003 00114)
</BuildingName>
<CallerName>darion</CallerName>
<CallerPhone>519-971-7033</CallerPhone>
<CreationDate>8/13/2014 4:53:01 PM</CreationDate>
<DispatchedDate>8/13/2014 4:54:43 PM</DispatchedDate>

FIG. 30b

```
<?xml version="1.0"?>
<DATA_ELEMENT>
  - <SERVICE_DATA>
        <NSA_CD>134</NSA_CD>
        <BUILDING_NAME>MANULIFE CTR</BUILDING_NAME>
        <STREET_ADDRESS>44 CHARLES ST W</STREET_ADDRESS>
        <CITY>TORONTO</CITY>
        <PROV>ON</PROV>
        <GOVT_NUMBER>021710</GOVT_NUMBER>
        <CNTRCT_OFFICE>FT</CNTRCT_OFFICE>
        <CNTRCT_NUMBER>05253</CNTRCT_NUMBER>
        <MACHINE_NUMBER>971343</MACHINE_NUMBER>
        <CALL_TYPE>S</CALL_TYPE>
        <CALL_DATE>2014-08-14</CALL_DATE>
        <CALL_TIME>19:07</CALL_TIME>
        <CALL_COMPLETED_DATE>2014-08-14</CALL_COMPLETED_DATE>
        <CALL_COMPLETED_TIME>23:36</CALL_COMPLETED_TIME>
        <RESPONSE_TIME>209</RESPONSE_TIME>
        <DEFER_IND>N</DEFER_IND>
        <CUSTOMER_REPORTED_1>H/R P7 CON ELV, STK B/T 1ST & 31ST FLR, HAD
            TRAPPED PASS-NOW OUT,</CUSTOMER_REPORTED_1>
        <CUSTOMER_REPORTED_2>CUST S/D ELV, OTCB AUTH NOW, ETA
            NDD</CUSTOMER_REPORTED_2>
        <PROB_CD>F01</PROB_CD>
        <PROBLEM_DESCRIPTION>HOISTWAY DOORS -
            INTERLOCK/ELECTRICAL</PROBLEM_DESCRIPTION>
        <PERF_DESC>ADJUSTED</PERF_DESC>
        <PERF_BY>OTIS</PERF_BY>
        <CAR_OCCUPIED>N</CAR_OCCUPIED>
        <REG_OT_IND>O</REG_OT_IND>
        <CALLER_NAME>SHAMIKA MALCOLM/NFC</CALLER_NAME>
        <MECHANIC_NAME>DOWNEY, BRIAN</MECHANIC_NAME>
        <PROCEDURE_DATE/>
        <PROCEDURE_CODE/>
        <PROCEDURE_DESCRIPTION/>
        <MINUTES_WORKED/>
        <PROV_GOVT_UNIT>021710</PROV_GOVT_UNIT>
    </SERVICE_DATA>
  - <SERVICE_DATA>
        <NSA_CD>134</NSA_CD>
        <BUILDING_NAME>NORTH AMERICAN CENTRE</BUILDING_NAME>
        <STREET_ADDRESS>5650 YONGE STREET</STREET_ADDRESS>
        <CITY>NORTH YORK</CITY>
        <PROV>ON</PROV>
        <GOVT_NUMBER>39019</GOVT_NUMBER>
        <CNTRCT_OFFICE>FTM</CNTRCT_OFFICE>
        <CNTRCT_NUMBER>05705</CNTRCT_NUMBER>
        <MACHINE_NUMBER>D98306</MACHINE_NUMBER>
        <CALL_TYPE>P</CALL_TYPE>
```

FIG. 31a

<CALL_DATE/>
<CALL_TIME/>
<CALL_COMPLETED_DATE/>
<CALL_COMPLETED_TIME/>
<RESPONSE_TIME/>
<DEFER_IND/>
<CUSTOMER_REPORTED_1/>
<CUSTOMER_REPORTED_2/>
<PROB_CD/>
<PROBLEM_DESCRIPTION/>
<PERF_DESC/>
<PERF_BY/>
<CAR_OCCUPIED/>
<REG_OT_IND/>
<CALLER_NAME/>
<MECHANIC_NAME>DAVIDSON, GRANT</MECHANIC_NAME>
<PROCEDURE_DATE>09/03/2014</PROCEDURE_DATE>
<PROCEDURE_CODE>990H</PROCEDURE_CODE>
<PROCEDURE_DESCRIPTION>Sched UV Hydro</PROCEDURE_DESCRIPTION>
<MINUTES_WORKED>15</MINUTES_WORKED>
<PROV_GOVT_UNIT>39019</PROV_GOVT_UNIT>
</SERVICE_DATA>
</DATA_ELEMENT>

FIG. 31b

SampleDataFromVendor3

```
<?xml version="1.0" encoding="utf-16"?>
<ArrayOfDT_Notif
xmlns:xsi="http://www.w3.org/2001/XMLSchema-instance"
xmlns:xsd="http://www.w3.org/2001/XMLSchema">
  <DT_Notif>
    <NotifDT>07/12/2014 07:06:55 AM</NotifDT>
    <NotifNum>44144199</NotifNum>
    <Prty>3</Prty>
    <EquipID>T5785621</EquipID>
    <EquipDesc>North ESC 1</EquipDesc>
    <Status>NOTIFICATION CLOSED OUT</Status>
    <IsBillable>N</IsBillable>
    <DsrdDT>07/12/2014 07:06:55 AM</DsrdDT>
    <DispDT>07/12/2014 07:17:34 AM</DispDT>
    <OperDisp />
    <Control />
    <TechID>00501949</TechID>
    <TechName>BRIAN HUNTER</TechName>
    <ArrvDT>07/12/2014 10:28:50 AM</ArrvDT>
    <BISDT>07/12/2014 11:34:41 AM</BISDT>
    <DepDT>07/12/2014 11:34:41 AM</DepDT>
    <CallerName>ALAN- SEC @ 4169612311</CallerName>
    <ProblemDesc>(B93-ZC1) ESC N1- INSRVC- MAKES GRINDING NOISE WHEN
STEPPING ON PLATFORM CLD CUST SHAMEKA W/ETA-GV ETA APRX
9:30</ProblemDesc>
    <Comment />
    <ReptDT>07/12/2014 07:06:55 AM</ReptDT>
    <LongText>ADJUST HANDRAIL TENSION TO REMOVE BUZZING</LongText>
    <WorkorderNo />
    <CallCode>B93</CallCode>
  </DT_Notif>
  <DT_Notif>
    <NotifDT>07/12/2014 07:08:45 AM</NotifDT>
    <NotifNum>44144201</NotifNum>
    <Prty>3</Prty>
    <EquipID>T5785632</EquipID>
    <EquipDesc>North ESC 2</EquipDesc>
    <Status>NOTIFICATION CLOSED OUT</Status>
    <IsBillable>N</IsBillable>
    <DsrdDT>07/12/2014 07:08:45 AM</DsrdDT>
    <DispDT>07/12/2014 07:24:14 AM</DispDT>
    <OperDisp />
    <Control />
    <TechID>00501949</TechID>
    <TechName>BRIAN HUNTER</TechName>
    <ArrvDT>07/12/2014 09:58:12 AM</ArrvDT>
    <BISDT>07/12/2014 10:27:56 AM</BISDT>
    <DepDT>07/12/2014 10:27:56 AM</DepDT>
    <CallerName>ALAN- SEC @ 4169612311</CallerName>
    <ProblemDesc>(B92-ZC1) ESC N2- INSRVC- MAKES BUZZING NOISE EVERY
FEW MINUTES CLD CUST SHAMEEKA W/ETA-GV ETA APRX 9:30</ProblemDesc>
    <Comment />
```

Page 1

FIG. 32a

SampleDataFromVendor3

```
    <ReptDT>07/12/2014 07:08:45 AM</ReptDT>
    <LongText>LOWER LANDING PLATE GRINDING ON STEP TREADS. RAISED
PLATE, TESTED, RTS</LongText>
    <WorkOrderNo />
    <CallCode>892</CallCode>
  </DT_Notif>
  <DT_Notif>
    <NotifDT>07/13/2014 01:12:38 PM</NotifDT>
    <NotifNum>44154068</NotifNum>
    <Prty>3</Prty>
    <EquipID>T5785632</EquipID>
    <EquipDesc>North ESC 2</EquipDesc>
    <Status>NOTIFICATION CLOSED OUT</Status>
    <IsBillable>N</IsBillable>
    <DsrdDT>07/13/2014 01:12:38 PM</DsrdDT>
    <DispDT>07/13/2014 01:19:00 PM</DispDT>
    <OperDisp />
    <Control />
    <TechID>00501949</TechID>
    <TechName>BRIAN HUNTER</TechName>
    <ArrvDT>07/13/2014 03:04:51 PM</ArrvDT>
    <BISDT>07/13/2014 03:35:51 PM</BISDT>
    <DepDT>07/13/2014 03:35:51 PM</DepDT>
    <CallerName>JERRY-SECURITY @ 4169612311</CallerName>
    <ProblemDesc>(B93-ZC1) ESC NORTH 02 CUST S/D BURNING RUBBER SMELL
COMING FROM RIGHT HANDRAIL GV JERRY 3:15 PM FT ETA</ProblemDesc>
    <Comment />
    <ReptDT>07/13/2014 01:12:38 PM</ReptDT>
    <LongText>HANDRAIL ADJUSTMENT.</LongText>
    <WorkOrderNo />
    <CallCode>893</CallCode>
  </DT_Notif>
  <DT_Notif>
    <NotifDT>07/14/2014 06:48:40 PM</NotifDT>
    <NotifNum>44168238</NotifNum>
    <Prty>3</Prty>
    <EquipID>T5785621</EquipID>
    <EquipDesc>North ESC 1</EquipDesc>
    <Status>NOTIFICATION CLOSED OUT</Status>
    <IsBillable>N</IsBillable>
    <DsrdDT>07/14/2014 07:03:00 PM</DsrdDT>
    <DispDT>07/14/2014 09:09:37 PM</DispDT>
    <OperDisp />
    <Control />
    <TechID>00500351</TechID>
    <TechName>PAUL O'NEILL</TechName>
    <ArrvDT>07/14/2014 09:34:27 PM</ArrvDT>
    <BISDT />
    <DepDT>07/14/2014 10:00:29 PM</DepDT>
    <CallerName>JERRY-SECURITY @ 4169612311</CallerName>
    <ProblemDesc>(B93-ZC1) ESC 1 CUST SD AFTER BURNNG SMELL CAME FROM
HANDRAIL CLD FT ONEILL CELL/ HE WILL PICK UP ON LINK
```

Page 2

FIG. 32b

SampleDataFromVendor3

```
ASAP</ProblemDesc>
    <Comment />
    <ReptDT>07/14/2014 06:48:40 PM</ReptDT>
    <LongText>RAN ESC FOR 25 MINUTES , RIGHT HANDRAIL WAS A LITTLE
WARM . SHUT IT DOWN AND LEFT FOR ESC CREW. .</LongText>
    <WorkOrderNo />
    <CallCode>B93</CallCode>
  </DT_Notif>
  <DT_Notif>
    <NotifDT>07/14/2014 06:49:06 PM</NotifDT>
    <NotifNum>44168239</NotifNum>
    <Prty>3</Prty>
    <EquipID>TS785632</EquipID>
    <EquipDesc>North ESC 2</EquipDesc>
    <Status>NOTIFICATION CLOSED OUT</Status>
    <IsBillable>Y</IsBillable>
    <DsrdDT>07/14/2014 07:04:00 PM</DsrdDT>
    <DispDT>07/14/2014 09:09:15 PM</DispDT>
    <OperDisp />
    <Control />
    <TechID>00500351</TechID>
    <TechName>PAUL O'NEILL</TechName>
    <ArrvDT>07/14/2014 10:01:47 PM</ArrvDT>
    <BISDT>07/14/2014 10:16:03 PM</BISDT>
    <DepDT>07/14/2014 10:16:03 PM</DepDT>
    <CallerName>CHRIS SEC @ 4169612311</CallerName>
    <ProblemDesc>(B05-ZC7) ESC 2 CUST S/D BURNING SMELL COMING FROM
HANDRAIL ADVISED P/C ETA EXPIERD MD OUT</ProblemDesc>
    <Comment />
    <ReptDT>07/14/2014 06:49:06 PM</ReptDT>
    <LongText>ROA</LongText>
    <WorkOrderNo>5350250604</WorkOrderNo>
    <CallCode>B05</CallCode>
  </DT_Notif>
  <DT_Notif>
    <NotifDT>07/21/2014 06:21:07 AM</NotifDT>
    <NotifNum>44233241</NotifNum>
    <Prty>3</Prty>
    <EquipID>TS231030</EquipID>
    <EquipDesc>South ESC 4</EquipDesc>
    <Status>NOTIFICATION CLOSED OUT</Status>
    <IsBillable>N</IsBillable>
    <DsrdDT>07/21/2014 06:21:07 AM</DsrdDT>
    <DispDT>07/21/2014 11:20:15 AM</DispDT>
    <OperDisp />
    <Control />
    <TechID>00500761</TechID>
    <TechName>SCOTT GLENN</TechName>
    <ArrvDT>07/21/2014 11:42:02 AM</ArrvDT>
    <BISDT>07/21/2014 11:24:20 AM</BISDT>
    <DepDT>07/21/2014 11:24:20 AM</DepDT>
    <CallerName>STEVE- SEC @ 4169612311</CallerName>
```

Page 3

FIG. 32c

SYSTEMS AND METHODS FOR ACTIVELY MONITORING AND CONTROLLING LIFT DEVICES

CROSS-REFERENCE TO RELATED APPLICATIONS

This application is a continuation-in-part of U.S. patent application Ser. No. 15/049,336, filed on Feb. 22, 2016 and titled "System For Monitoring Elevators and Maintaining Elevators", which is a continuation-in-part of U.S. patent application Ser. No. 14/514,260, filed on Oct. 14, 2014 and titled "Method of Retrieving and Uniformalizing Elevator Maintenance and Callback Data and Code Events".

TECHNICAL FIELD

The one or more inventions generally relate to monitoring lift devices and maintaining the maintenance of the lift devices, such as elevators and escalators.

BACKGROUND

Often, facility owners have multiple service providers for escalators or elevators, or both, to maintain and repair their equipment, which is generally manufactured by various manufacturers. The service provider provides regular maintenance visits on a monthly, quarterly, or annual basis, as well as support in case of emergency (also called "callback").

Callback is typically initiated by facility owners by using a telephone to call the service provider. Once initiated, the service provider enters the information obtained from the telephone discussion into its internal computer system and dispatches a technician to travel to the location of the faulty lift device. The information generated from the call and the dispatch becomes a part of the callback history, which is stored in a database. In some cases, facility owners are able to monitor and access the callback history, via an Internet connection, from the service provider's website.

In many instances, a technician (i.e. a person) is sent to the elevator or escalator or moving sidewalk, herein interchangeably referred to as a "lift device", to diagnose the problem. The technician is physically present at the lift device and performs a series of tests to determine the operational performance or problems of the lift device.

SUMMARY

Example aspects and embodiments of the proposed devices, systems and methods are provided herein. However, the devices, systems and methods are not limited to the features described in this summary section. Furthermore, there may be additional aspects of the systems and methods that are not stated in this summary section.

Typically a technician is physically present to investigate a malfunction of an elevator system. Devices, systems and methods are provided for actively monitoring one or more lift devices, such as elevators and escalators. A computing system for electrically controlling an elevator controller, includes: a processing device (also called a field board, electronic device or field device) electrically connected to an elevator controller, and the processing device communicates with a computing platform device, which in turn is connected to a server over the Internet. The processing device includes relay switches that are electrically connected to the elevator controller. The server sends poking commands that triggers a relay switch to open or close, which causes the elevator controller to generate a call signal to move the elevator to an upper or a lower floor. If the elevator does not move according to a poking command, then a malfunction is reported.

In a general example embodiment, a processing device is provided for electrically connecting to an elevator controller. The processing device includes:

a digital controller;

multiple electrical relay switches, each individually controlled by the digital controller to open or close;

multiple terminal blocks that respectively are electrically connected to the multiple electrical relay switches, and each one of the terminal blocks comprising two electrical contacts that are connectable with two wires of the elevator controller; and a transceiver in communication with the digital controller, the transceiver configured to receive one or more commands to open or close a given electrical relay switch.

In another general example embodiment, a computing system is provided for electrically controlling an elevator controller. The computing system includes: a first processing device (also called a field board, electronic device or field device) comprising multiple electrical relay switches that are respectively electrically connected to multiple terminal blocks, and the multiple terminal blocks are respectively electrically connectable to the elevator controller; the first processing device further comprising a digital controller to control each of the electrical relay switches and a transceiver; a computing platform device comprising a processor, a memory device, a first transceiver that communicates with the transceiver of the first processing device, and a network communication device; and the computing platform device configured to receive or generate a command to electrically affect the elevator controller, and subsequently generate and transmit a relay switch command to the first processing device, and the processing device is configured to open or close a given electrical relay switch responsive to receiving the relay switch command.

BRIEF DESCRIPTION OF DRAWINGS

Embodiments will now be described by way of example only with reference to the appended drawings wherein:

FIGS. 18*a*, 18*b* and 18*c* show examples of datasets;

FIGS. 19*a*, 19*b* and 19*c* show examples of other datasets;

FIG. 20*a* shows an example of an XML string being transmitted;

FIG. 20*b* shows an example of data conversion;

FIG. 20*c* shows the data types of the Building Events Table;

FIG. 27 is a screenshot of an example GUI showing critical hours and error codes;

FIG. 28 is a screenshot of an example GUI showing a report showing reformatted error codes associated with certain elevators or escalators, or both;

FIG. 29*a* shows an example of XML data from Vendors that is used to encapsulate the maintenance or callback history, or both, of an elevating device;

FIG. 29*b* shows an example of XML data from Vendors that is used to encapsulate the maintenance or callback history, or both, of an elevating device;

FIG. 29*c* shows an example of XML data from Vendors that is used to encapsulate the maintenance or callback history, or both, of an elevating device;

FIG. 30*a* shows an example of XML data from Vendors that is used to encapsulate the maintenance or callback history, or both, of an elevating device;

FIG. 30*b* shows an example of XML data from Vendors that is used to encapsulate the maintenance or callback history, or both, of an elevating device;

FIG. 31*a* shows an example of XML data from Vendors that is used to encapsulate the maintenance or callback history, or both, of an elevating device;

FIG. 31*b* shows an example of XML data from Vendors that is used to encapsulate the maintenance or callback history, or both, of an elevating device;

FIG. 32*a* shows an example of XML data from Vendors that is used to encapsulate the maintenance or callback history, or both, of an elevating device;

FIG. 32*b* shows an example of XML data from Vendors that is used to encapsulate the maintenance or callback history, or both, of an elevating device; and FIG. 32*c* shows an example of XML data from Vendors that is used to encapsulate the maintenance or callback history, or both, of an elevating device.

DETAILED DESCRIPTION

Figure 1:
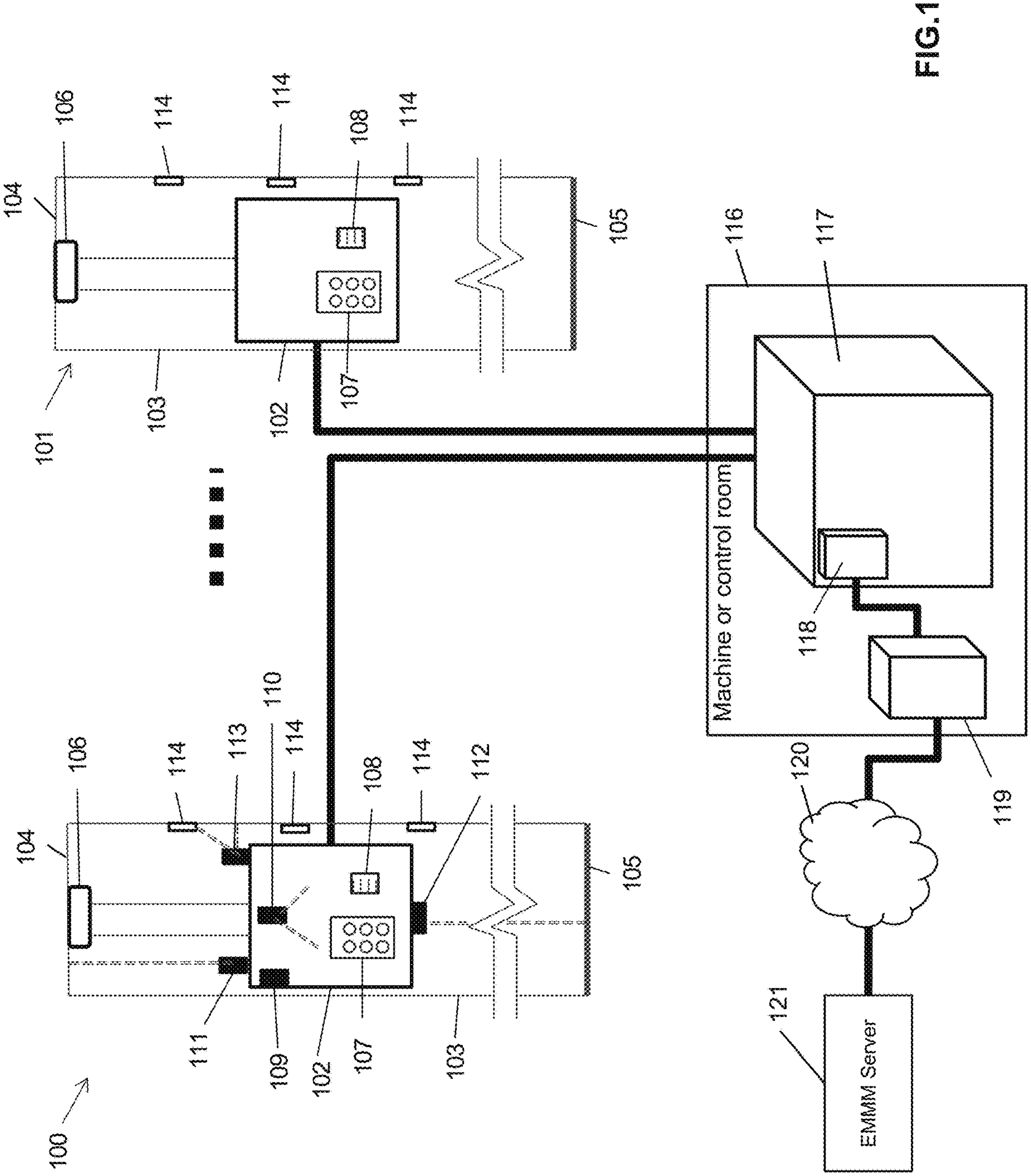
FIG. 1 is schematic of an elevator system that is controllable and actively monitored by a remote server, according to an example embodiment of the present invention.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

The term "elevator" is used herein in most examples. However, it will be appreciated that the principles and examples described herein with respect to elevators may also apply to other lift devices, such as escalators and moving sidewalk, also called moving walkways. The term "lift devices" is herein used to refer to elevators, escalator and moving walkways.

It is herein recognized that there are multiple difficulties in monitoring and maintaining lift devices.

When using sensors alone, it herein recognized that it is very difficult to determine the operational malfunction of an elevator and the technical nature of that malfunction. While it is recognized that some original equipment manufacturers use specialised remote diagnostic devices, this is not typical for 80% of the equipment. In practice, a technician is sent to the elevator's location to assess it. The technician physically goes into the elevator car and presses buttons to see if the elevator car is working. For example, the technician presses a button for an upper floor to see if the elevator car will go up to that upper floor. Or, for example, the technician presses a button for a lower floor to see if the elevator car will go down to that lower floor. Alternatively, the technician will go to the machine room in the same building as the elevator and access the elevator controller to perform the same testing (e.g. press buttons or toggle switches to see if the elevator car is working). This is a helpful process to diagnose the problem starting from the elevator system. However, it is recognized that this process requires a technician to be physically present, which is time consuming. It is also recognized that at times the elevator or escalator resets (e.g. watchdog timer, time lapse fault, etc.) which returns the elevator back into service without anyone knowing. When the technician shows up, the elevator is working and the problem is not diagnosed.

While some newer elevator systems are remotely controlled, many existing elevator systems do not have such capabilities. Therefore, it is herein recognized that it is desirable to provide such remote controllable functionality to existing elevator systems. It is also herein recognized that providing a remotely controllable capability to an elevator is difficult, for example, without significantly modifying the elevator components, or negatively affecting the normal operation of the elevator.

It is also herein recognized that there are many different types of elevators, escalators and moving walkways, which are made by different manufacturers. Even the same manufacturer may make different electrical systems, hardware components and software for their elevators, or their escalators, or their moving walkways, or a combination thereof. This variation in technology makes it difficult to interact with a lift device, including providing a remote controllable functionality. It is herein recognized that it is desirable to create a device that is capable of interfacing with different lift devices.

It is also herein recognized that there are security instances in which there are secured floors that only an authorized person with a key pass (e.g. a card, a password, some other authentication means, etc.) is able to access that secured floor. An unauthorized person without a key pass can enter into the elevator car, but they cannot command the elevator car to go to the secured floor. However, in some cases, the unauthorized person hides and waits in an elevator, so that when the elevator is called to the secured floor (e.g. a person on the secured floor calls for the elevator), the unauthorized person hitches a ride to the secured floor. This behaviour is called "scoping" and poses a risk of a security breach. It is herein recognized that it is desirable to detect scoping. It is also herein recognized that scoping can sometimes be confused with entrapment, such as when a person is stuck in an elevator for a long time due to failure of the elevator or due to when a person is physically incapacitated. Therefore, it is herein recognized that it is desirable to determine the difference between a scoping situation and an entrapment situation, and to automatically respond appropriately.

It is also herein recognized that aspects of various lift devices can be monitored using different technologies to improve active maintenance and improved responsiveness.

It is also herein recognized that facility owners have a single building or multiple buildings, and in both cases they generally have multiple service providers. With the use of multiple service providers, facility owners are forced to manage multiple accounts in order to access the different web applications from each service provider. Additionally, the various service providers utilize different codes, data formats and presentations with respect to their data files. These codes and data formats are part of the service provider's or the manufacturer's computer system. Therefore, for the facility owner, it herein recognized that it is a mammoth task to collect and interpret the information from the various service providers, as there is no uniformalization of information storage among the various service providers. To further complicate this situation, service providers' computer files are not always available, and are typically accessible only on an on-demand basis.

It is also herein recognized that, at the conclusion of a contract for services, facility owners may decide not to extend the contract with the service providers depending on multiple factors (e.g., quality of service, new service provider offers, etc.). When the contract between the facility owner and the service provider is terminated, the facility owner no longer has access to data and the computing systems of the service provider during the contract tenure. As a result, the callback and maintenance history is no longer available to the facility owner.

Since elevators and escalators have become computer controlled, they store elevator codes or events (e.g., information on the heat detectors or landing sensors) in the controller. It is herein recognized that, unfortunately, elevator/escalator code/event information is stored in a form that is proprietary to each manufacturer, and usage and maintenance data from different manufacturers cannot be compared.

Technicians who service elevators and escalators typically need to be at the physical location of the elevator controller to access the data from the controller. In particular, a technician is able to access various statistical data, events of use and the last service intervals from each elevator. From this data, technicians are able to facilitate servicing of the equipment.

It is herein recognized that, in some cases the facility owner is able to access the controller's event and code via a computer that is directly connected to the controller, either wired or wirelessly. The computer typically is at the same location as the controller. It is herein recognized that due to the direct connection between the controller and the facility owner's computer, the facility owner must be at the computer in order to open and view the event and code from the controller. As a result of the direct data connection between the controller and the computer, the facility owner has to manage multiple accounts and different computers located at different physical locations. Additionally, the facility owner has no backup in case of data failure/disaster recovery. Further, the facility owner may not have experience understanding the data from the controller. Furthermore, it is very unlikely that the facility owner would have the experience or knowledge to interpret the controller data to anticipate problems.

It is herein recognized that comparison of maintenance and usage data from various manufacturers is beneficial as it enables streamlining of maintenance procedures and comparison of elevators under different usage circumstances. It is also herein recognized that a method of uniformalizing has not been heretofore been used, which leads to the above noted technical difficulties. Therefore, it is herein recognized that it is desirable to retrieve and uniformalize elevator usage and maintenance data.

It is also herein recognized that current computing systems do not provide timely information to facility owners. Or, if information is constantly provided or accessible to a facility owner, the urgency of the information is not indicated. Typically, computing systems for elevators do not automatically process currently received elevator controller data and historical data stored in a database to identify the technical issues of an elevator, and nor do typical computing systems executed computations to determine and output recommendations for addressing these technical issues.

The devices, systems and methods described herein address one or more of the above various technical difficulties.

Turning to FIG. 1, elevator systems 100 and 101 are shown, which are in electrical communication with an elevator controller 117 that is located within a machine or control room 116. The room 116 is typically located within the same building as the elevator systems 100 and 101.

A field board 118 is in electrical communication or data communication, or both, with the elevator controller 117. For example, electrical wires between the field board 118 and the elevator controller 117 allow the two devices to interact with each other. The field board 118 is in data communication or electrical communication, or both, with a platform computing device 119, which is also located within the vicinity of the field board 118. For example, the field board and the computing platform device are both within the same building. In another example, the field board and the computing platform device are both within the same room 116. In another example, the field board and the computing platform device are both located within the housing of the elevator controller.

In an example embodiment, the field board 118 and the platform computing device 119 are added to an existing elevator controller. This is sometimes called a retrofit.

The computing platform device 119 is in data communication with an elevator monitoring, maintenance and management (EMMM) server 121 over a wireless network connection 120, such as, but not limited to, the Internet. The EMMM server processes data in relation to various types of lift devices.

In an example embodiment, the EMMM server 121 is in data communication with other computing machines or devices, including one or more of: a server of an elevator service provider, a server of a safety monitoring party, and a computing device of a facility owner. The system collects elevator data, escalator data, or moving walkway data, or combinations thereof, and processes the same to, for example, index events, monitor the status of lift devices, identify technical problems, and provide notifications and reports. For example, a safety monitoring party is a technical and safety standards authority that enforces safety.

In an example embodiment, the elevator system 100 includes an elevator car 102 located within an elevator shaft 103. The elevator shaft includes a top structure (e.g. a ceiling) 104 that includes a pulley system 106 for the elevator car and a pit floor 105 located at the bottom of the shaft. In an example embodiment, the elevator shaft 103 includes brackets 114 or protruding structures located on the sidewall. For example, these brackets are placed at every floor, or are placed in greater number. Typically these brackets are evenly spaced.

The elevator car 102 also includes a button panel 107 and an audio communication system 108. For example, a user presses a button on the button panel 107 to indicate the floor that they wish to travel to. In another example, the audio communication system 108 allows a person that is not in the elevator car 102 (e.g. a security guard or a technician located in a different part of the building or external to the building) to make an audio announcement to the person in the elevator car. In other words, the communication system 108 is one-way. In another example, the audio communication system 108 provides two-way audio communication, such as by way of a telephone.

The elevator car 102 also includes various sensors. One or more of these sensors are, for example, retrofitted to an existing elevator car. Alternatively, or in addition, one or more of these sensors are already integrated to the elevator car. In an example embodiment, only one sensor is mounted to the elevator and, in another example embodiment, there are multiple sensors. In an example embodiment, one or more sensors are mounted within the elevator car. In addition or in the alternative, one or more sensors are mounted externally on to the elevator car.

In an example embodiment, a sensor 109 is mounted within the elevator car and it detects the presence of a person. For example, the sensor 109 is a camera that captures images (e.g. video or photos, or both) of the space within the elevator car. In an example embodiment, several cameras are mounted within the elevator car at different positions and these cameras may be of the same type, or may be of different types. The camera, for example, is an infrared camera. In another example, the camera is a typical camera that captures visible light. Other types of cameras can be used to detect a person. Currently known and future known image processing software may be used to process the image data from the camera or cameras and to automatically determine the presence of a person within the elevator car. The image processing software is also used to determine whether a person is moving or is staying still.

In another example, a sensor 110 is mounted within the elevator car and it emits or detects energy, or both, to detect whether a person is within the elevator car. For example, the sensor 110 is a RADAR sensor, or a light sensor, or a passive infrared sensor, or an ultrasonic sensor.

In another example, a sensor is mounted to the floor of the elevator car to detect the weight or pressure of a person standing or sitting in elevator car.

Other currently known and future known sensors for detecting a presence of a person that is within an elevator car are applicable to the principles described herein.

In another example, a sensor 111 is mounted externally to the elevator car, on its top, and detects the distance between the top of the elevator car and the top structure 104 of the elevator shaft. In this way, the distance information obtained by the sensor 111 can be used to compute the motion of the elevator car (e.g. whether it is moving up or down, and at what speed) and the position of the elevator car. The sensor 111 can be a RADAR sensor or another type of sensor that detects distance.

In another example, a sensor 112 is mounted externally to the elevator car, on its bottom, and detects the distance between the bottom of the elevator car and the pit floor 105 of the elevator shaft. In this way, the distance information obtained by the sensor 112 can be used to compute the motion of the elevator car (e.g. whether it is moving up or down, and at what speed) and the position of the elevator car. The sensor 112 can be a RADAR sensor or another type of sensor that detects distance.

In another example, a sensor 113 is mounted externally to the elevator car, and it is oriented to point at a side wall of the elevator shaft to detect the brackets 114. As the sensor 113 moves towards or away from a given bracket, it detects if the distance between the sensor 113 and the given bracket is getting smaller or larger. In this way, the sensor data can determine the direction of motion of the elevator. Furthermore, the change of distance over time is also used to determine the speed of the elevator. The sensor 113 can be a RADAR sensor or another type of sensor that detects distance.

For example, if the sensor 113 is pointing at an upward angle, and the computing device determines that the sensor is moving closer to given bracket, then the computing device determines that the elevator is moving upwards. It will be appreciated that different orientations and positions of the sensor 113 will vary the exact computations, for example, according the principles described herein.

In another example embodiment, an accelerometer is mounted to the elevator car and is used in combination or in alternative to the above noted sensors to detect the motion of the elevator car.

Other currently known and future known sensors for detecting the motion or position of an elevator car, or both, are applicable to the principles described herein.

The sensors mounted to the elevator car are in data communication with the elevator controller 117 or the field board 118, or both. In this way, the data measured by the sensors can be processed by any one or more of the elevator controller, the field board, the computing platform device, and the EMMM server.

The field board and the computing platform device, for example, form a kit of parts that can be used to improve monitoring of existing elevator controllers. One or more of the sensors are, for example, also included in the kit of parts.

Figure 2:
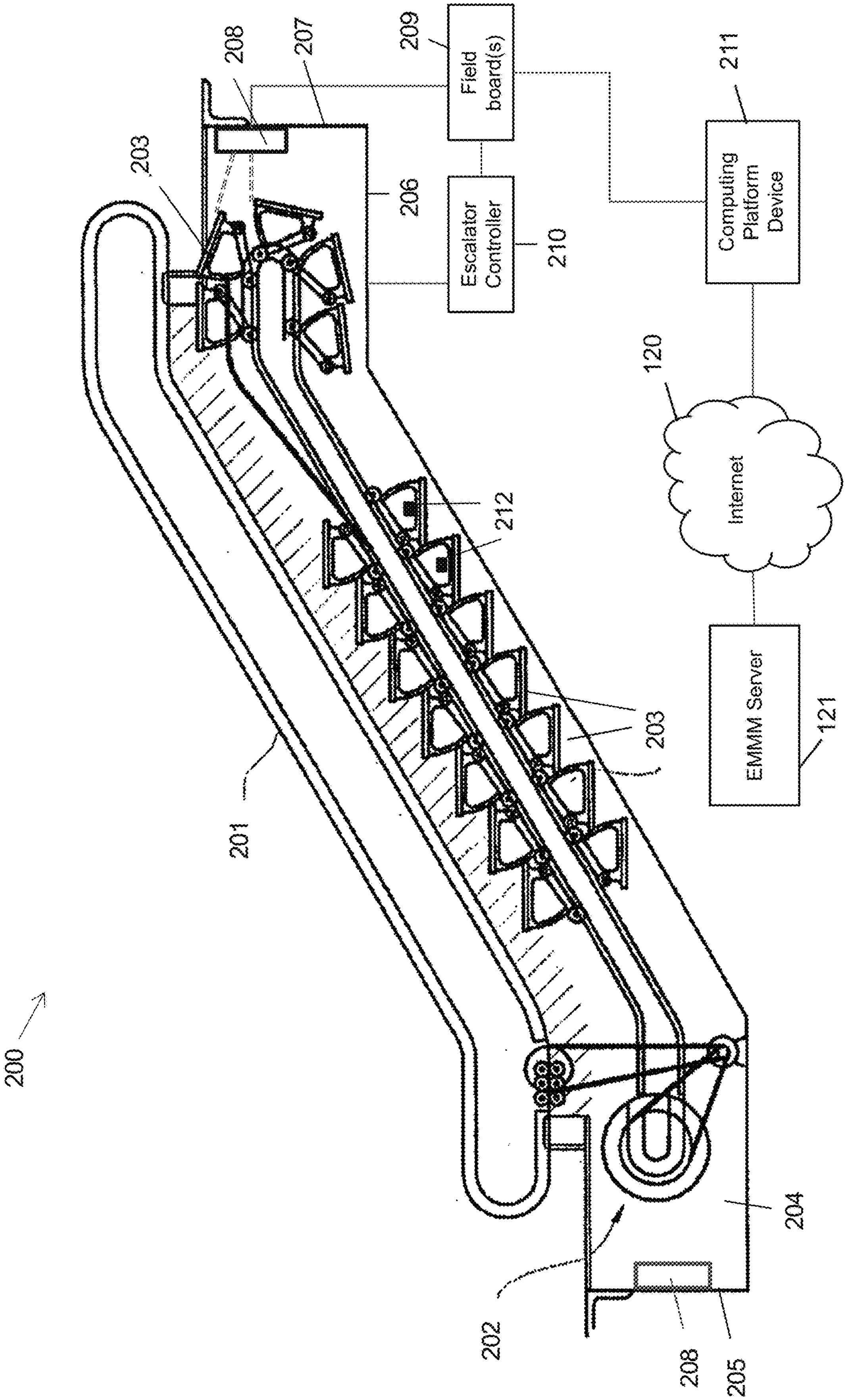
FIG. 2 is a schematic of an escalator system that is controllable and actively monitored by a remote server, according to an example embodiment of the present invention.

Turning to FIG. 2, an example embodiment of an escalator system 200 is shown. It includes, amongst other things, a handrail 201, a lower equipment pit 204 and an upper equipment pit 206. A motor 202 is mounted within an equipment pit and it moves a track of escalator steps 203. The escalator is in data communication (e.g. either wired or wirelessly) with an escalator controller 210. The escalator controller 210, for example, is mounted in a machine room or control room in the same building as the escalator. A field board 209 is in electrical communication or data communication, or both, with the escalator controller 210. For example, electrical wires between the field board 209 and the escalator controller 210 allow the two devices to interact with each other. The field board 209 is in data communication or electrical communication, or both, with a platform computing device 211, which is also located within the vicinity of the field board 209. For example, the field board and the computing platform device are both within the same building. In another example, the field board and the computing platform device are both within the same machine room. In another example, the field board and the computing platform device are both located within the housing of the escalator controller.

In an example embodiment, the field board 209 and the computing platform device 211 are added to an existing escalator controller, called a retrofit.

The computing platform device 211 is in data communication with the EMM server 121 over the wireless network connection 120, such as, but not limited to, the Internet.

One or more sensors 208 are mounted to a structure (e.g. structures 207, 205) in the equipment pits. The sensors detect movement of the escalator steps. For example, a sensor 208 mounted in the upper equipment pit 206 emits an energy beam at a fixed orientation. For example, the sensor 208 is a RADAR sensor or another type of sensor that emits an energy beam to detect distance (e.g. sound beam, light beam, microwave beam, etc.). As a given escalator step moves in a certain direction, the measured distance between the sensor and the surface of the given escalator step with either grow closer or grow farther over time. When the computing device detects that the distance is growing closer, then the computing device computes that the escalator is one of (i) moving up and (ii) moving down. When the computing device detects that the distance is growing further apart, then the computing device computes that the escalator is the other one of (i) moving up and (ii) moving down. Furthermore, the change of the distance over time is used to compute the speed at which escalator steps are moving.

It is appreciated that the specific relationship between the measured distance data from the sensor and the motion of the escalator steps will vary based on the positioning and orientation of the sensor.

In another example, one or more inertial measurement units (IMUs) 212 are mounted to one or more escalator steps to detect the change in motion of the escalator. For example, the one or more IMUs are used to detect the stopping or slow-down of the escalator, or the speed-up of the escalator. In an example embodiment, the IMU is an accelerometer. In an example embodiment, the IMU is mounted within the cavity of the escalator step.

These one or more sensors 208, 212 are in data communication with the escalator controller 210 or the field board 209, or both. In this way, the data measured by the sensors can be processed by any one or more of the escalator controller, the field board, the computing platform device, and the EMMM server.

In an example embodiment, these one or more sensors 208, 212 are retrofitted to an existing escalator. These sensors provide independent verification of the movement of the escalator, compared to the existing control system of the escalator. This is helpful for monitoring potential or actual technical failures of the escalator.

It will be appreciated that the sensors and the devices described with respect to the escalator are also applicable to moving walkways, which also have a series of moving steps.

The field board and the computing platform device, for example, form a kit of parts that can be used to improve monitoring of existing escalator controllers or moving walkway controllers. One or more of the sensors are, for example, also included in this kit of parts.

Figure 3:
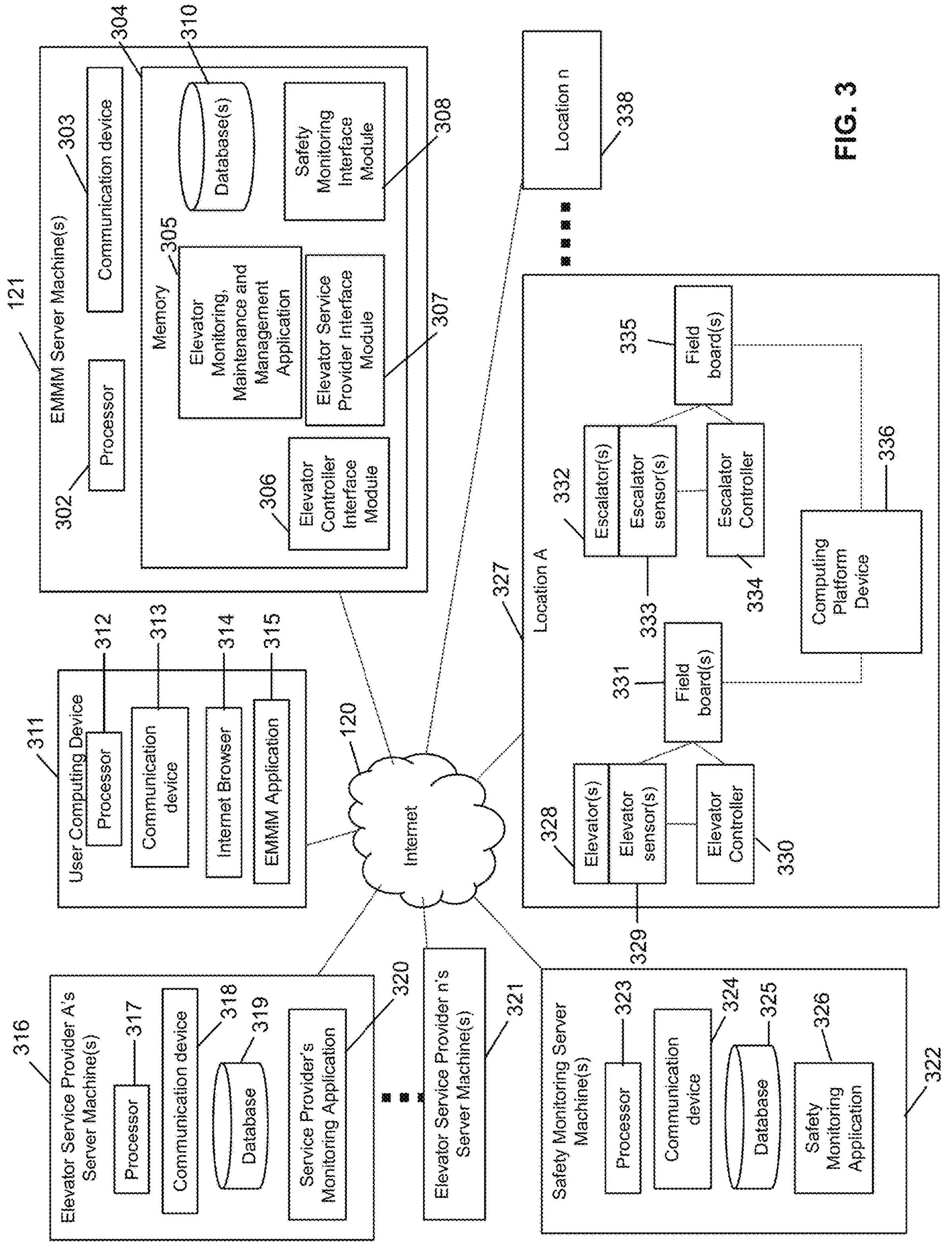
FIG. 3 is an example system diagram of an elevator monitoring, maintenance, and management (EMMM) server in data communication with other computing devices or server machines, or both.

Turning to FIG. 3, an example is provided that shows the data connectivity between various devices, including the elevators and the escalators. One or more EMMM server machines 121, a user computing device 311, one or more server machines of various elevator service providers 316, 321, one or more safety monitoring server machines 322 of a safety monitoring party, and computing devices at different elevator locations 327, 338 are in data communication with each other over an Internet network 120. Other communication networks may be used, which may or may not include the Internet. For example, some communication networks include telecommunication networks, LAN networks, or wireless networks, or combinations thereof.

While each entity may utilize multiple server machines as part of their own server system, for brevity, the term “server” will hereon be used. Therefore, it is appreciated that the term “server” includes one or more server machines.

The EMMM server 121 obtains data from the computing platform devices 336 from one or more locations. The EMMM server also obtains data from the safety monitoring servers 322. The EMMM server also provides data to the elevator service provider servers 316, the user computing devices 311, and the safety monitoring servers 322.

The EMMM server 121 includes a processor 302, a communication device 303 for receiving and transmitting data over the network 339, and memory 304. The memory includes one or more databases 310, an EMMM application 305, an elevator controller interface module 306 that interacts with a computing device 1600 connected to an elevator controller 330, an elevator service provider interface module 307 that interacts with an elevator service provider server 316, and a safety monitoring interface module 308 that interacts with a safety monitoring server 322. In an example embodiment, these interface modules interact with corresponding application programming interfaces (APIs). In another example embodiment, these interface modules include APIs or are APIs. The databases 310 may also be herein referred to as a datastore.

At a given location (e.g. Location A 327), there are one or more elevators 328 which are controlled by an elevator controller 330. Each elevator system is equipped with one or more sensors 329. Examples of these sensors include: encoders, current sensors, hall-effect sensors, floor level sensors, door sensors, limit switches, temperature probes, temperature sensors, RADAR sensors, light sensors, and pressure sensors. It will be appreciated that other currently known and future-known sensors used in elevators or other lift devices are applicable. The sensors provide data to the elevator controller 330 or the one or more field boards 331, or both. The elevator controller 330 is in electrical and data communication with one or more field boards 331. The one or more field boards 331 are in data communication (e.g. either wired or wireless) with a computing platform device 336.

In this example, one or more escalators 332 or moving walkways, or both, are being monitored with one or more sensors 333. The operation and of the one or more escalator is controlled by an escalator controller 334. Data from the sensors 333 is transmitted to the escalator controller or the one or more field boards 335, or both. The one or more field boards 335 are in electrical communication and data communication with the computing platform device 336.

Within a given location, e.g. Location A, there may be multiple elevators and multiple elevator controllers that are in communication with a computing platform device. Consider a building that has both elevators and escalators.

In an alternative example embodiment, although not shown, the functions of the field board and the computing platform device are combined into a physical device. In other words, multiple instances of computing platform devices are provided, and each given computing platform devices electrically connects directly to a given elevator or escalator controller. Furthermore, each computing platform device is able to be in wireless data communication with the EMMM server.

Other locations (e.g. Location n 338) have similar systems.

The EMMM application 305 uses the elevator controller interface module 306 to communicate with the computing platform device 336 over the Internet network 120. It will be appreciated that the EMMM application 305 is able to obtain various types of electronic information from an elevator controller and the escalator controller, and is able to process such electronic information for monitoring, maintenance and management. In another example, the EMMM server is in data communication with an intermediary computing device (not shown), which is data communication with the elevator controller or the escalator controller, or both.

In an example embodiment, the EMMM application 305 is able to obtain MCP (Maintenance Control Program) tests or maintenance tasks, or both, about the elevator controller. In other words, the data obtained by the EMMM server includes various types of data, including for example: fault logs, error warnings, and maintenance tasks.

The safety monitoring server 322 includes data systems for facilitating processes of safety regulation. For example, a safety regulating body issues inspection reports and inspection orders. An inspection order is a task that must be executed to maintain safety of the device. The server 322 includes a processor 323, a communication device 324, a database 325 to index and manage the safety and maintenance information of the elevators, and a safety monitoring application 326 that tracks the inspections and the inspection orders. The safety monitoring server 322 and the EMMM server 121 exchange data with each other to manage the inspections and the inspection orders.

The elevator service provider's server 316 includes a processor 317, a communication device 318, a database 319 and a service provider's monitoring application 320. The data stored and provided by the server 316 may be in a specific data format that is characteristic of the elevator service provider. In other words, another service provider n has stored on its server 321 elevator data that is in a different data format compared to the server 316. It will be appreciated that there may be multiple service providers, and their respective servers are in data communication with the EMMM server 121.

A facility owner is considered a user and uses a computing device 311 to monitor and interact with the management of the elevators and other lift devices for which they are responsible. As noted above, the EMMM server 121 is able to accommodate multiple facility owners, each facility owner responsible for different types of lift devices that may be at different locations. The facility owner, also called a user, uses a computing device that includes a processor 312, a communication device 313, and an Internet Browser 314. The graphical user interfaces (GUIs) provided by the EMMM server, for example, are web pages accessible via an Internet Browser. In another example, the computing device 311 includes an EMMM application 315. This may be desirable, for example, where the computing device is a mobile device (e.g. tablet, smart phone, cellphone, etc.), but the application may also be used with non-mobile devices. The computing device includes both mobile and non-mobile devices.

Figure 4:
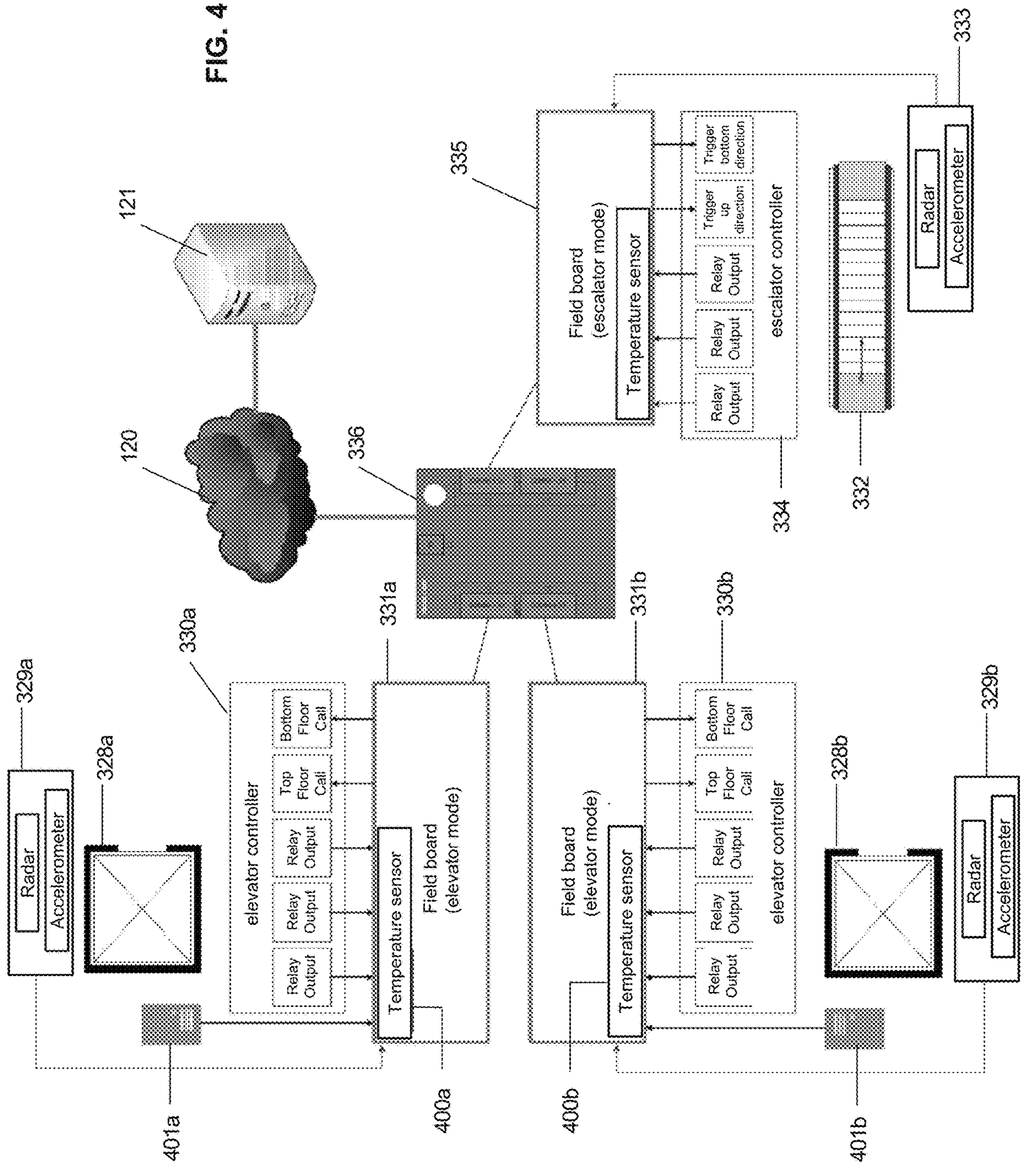
FIG. 4 is an example system diagram of local devices for controlling and actively monitoring elevators and escalators, and for communicating with the EMMM server.

Turning to FIG. 4, another example embodiment of the devices (e.g. the sensors, the controllers, the field boards, the computing platform device, the EMMM server, and the lift devices) is shown. The EMMM server 121 is in data communication with the computing platform device 336 over the Internet 120. The computing platform device 336 is in data communication with a field board 331*a* that is configured to be used to interact with an elevator controller 330*a*. The field board 331*a* includes a temperature sensor 400*a* mounted thereon to detect the temperature of the surrounding air. If a high temperature is detected, then preventative or reactive action is initiated.

The field board 331*a* is in data communication (e.g. wired or wireless) with one or more sensors 329*a* that measure certain aspects of the elevator 328*a*. The field board 331*a* is also in data communication (e.g. wired or wireless) with a communication device (e.g. a telephone) 401*a* that is mounted within the car of the elevator 328*a*.

The elevator controller 330*a* controls the elevator 328*a*. The elevator controller is in both electrical and data communication with the field board 331*a*. The field board 331*a* is able to obtain operational data about the elevator controller 330*a*. The field board 331*a* transmits the obtained data (e.g. operation data from elevator controller 330*a*, sensor data 329*a*, communication device data 328*a*, etc.) to the computing platform device 336. This data is also transmittable to the EMMM server 121 from the computing platform device 336.

In an example embodiment, the EMMM server 121 generates commands to control the elevator 328*a*, for example, responsive to data it has received from the computing platform device 336. The commands are sent to the computing platform device, which in turn transmits a command to the relevant field board (e.g. field board 331*a*). The field board 331*a* then generates a digital signal to affect the elevator controller 330*a*, which in turn controls the elevator 328*a*. In an example embodiment, the digital signal is used to control an electrical relay, which affects the circuitry of the elevator controller to either cause the elevator to move up or to move down. In another example embodiment, the computing platform device 336 generates the command to affect the elevator 328*a*, for example, responsive to the data it received from the field board 331*a*.

In an example embodiment, the electrical relay of the field board creates an electrical signal to cause the elevator controller to create a top floor call (e.g. calls the elevator to the top floor) or to create a bottom floor call (e.g. calls the elevator to the bottom floor). This has a similar effect of a person pressing top floor button on a control panel, or pressing a bottom floor button on the control panel, but a person is not required.

In another example aspect, the electrical relay switch opens or closes for a predetermined amount of time, which is herein called "poking" the elevator controller. For example, if the relay switch is normally open, and based on a digital signal, is commanded to close, then the relay switch will move to a closed state for a predetermined amount of time. For example, the predetermined amount of time is 10 seconds. However, other time amounts are applicable.

This process, for example, is also referred to as dry contacting. In other words, an elevator controller is not "wetted" by a voltage source from the field board. In another example, either in the alternative or in addition, the relay switch on the field board is not wetted by a voltage source from the elevator controller.

Various other electrical signals of the elevator controller 330*a* can be detected and controlled by other electrical relays on the field board 331*a*.

The computing platform device 336 is in data communication with a second field board 331*b*. This field board 331*b*, which may have its own temperature sensor 400*b*, is electrically connected to another elevator controller 330*b* that controls another elevator 328*b*. Another communication device 401*b* in the elevator 330*b* and sensors 329*b* are in data communication with the field board 331*b*.

The computing platform device 336 is also in data communication with a field board 335 configured to be electrically connected to an escalator controller 334, which controls an escalator 332. The field board 335 is also in data communication with sensors 333 that measure attributes of the escalator 333.

It will therefore be appreciated that the computing platform device 336 is configured to be in data communication with one or more field boards. These field boards may all control elevators, or may all control escalators. In another example, different field boards control different types of lift devices.

Figure 5:
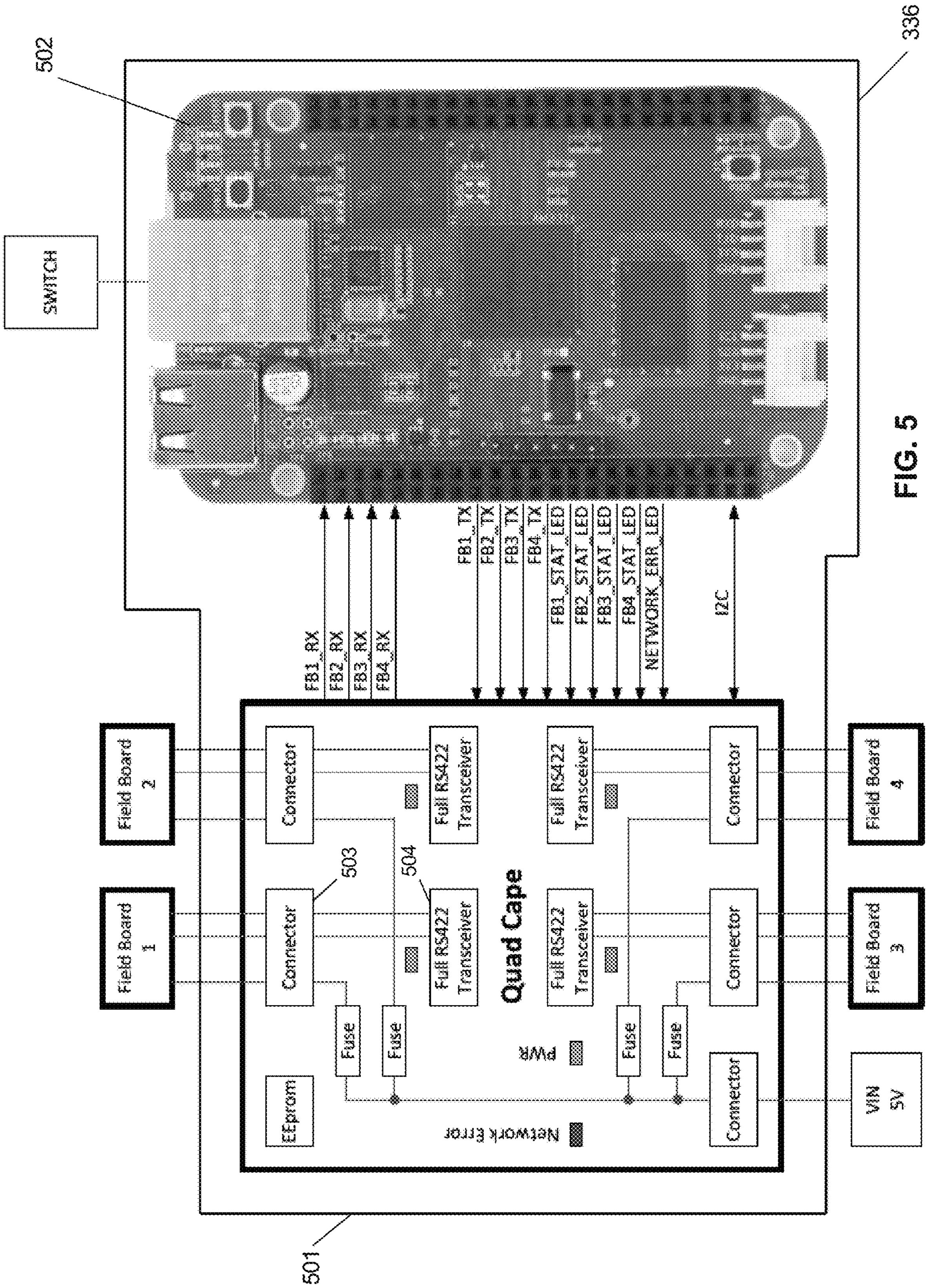
FIG. 5 is an example system diagram of a computing platform device.

Turning to FIG. 5, an example of a computing platform device 336 is shown. It includes a communication module 501 that includes multiple connectors and transceivers to connect to multiple field boards. In an example embodiment, the transceivers are RS422 transceivers. However, other types of transceivers may be used on the computing platform device that are compatible with the transceivers on the field boards. For example a physical cable connector 503 connects to Field Board 1, and the connector 503 is connected to a corresponding transceiver 504. There may be multiple ones of such connectors and such transceivers on the communication module 501. In an example embodiment, there are four of such connectors and transceivers, allowing the communication module 501 to connect to up to four field boards. However, in another example embodiment, more or less connectors are provided on the communication module 501.

Each of the transceivers are in data communication with a processing device 502, which is also part of the computing platform device 336. In an example embodiment, the processing device includes an operating system and performs computations based on the data received by a given field board. It also outputs commands to a given field board. In an example embodiment, the processing device 502 stores and executes various software applications via the operating system. The processing device 502 also has a communication device to connect with the transceivers, and another communication device to connect to the Internet and, thus, to the EMM server 121. For example, the other communication device to connect to the Internet is an Ethernet device. The processing device 502 also includes memory that stores data and executable instructions for processing data and commands.

In an example embodiment, the processing device 502 is a BeagleBone, a trade name of a product that is made available by BeagleBoard.org.

Figure 6:
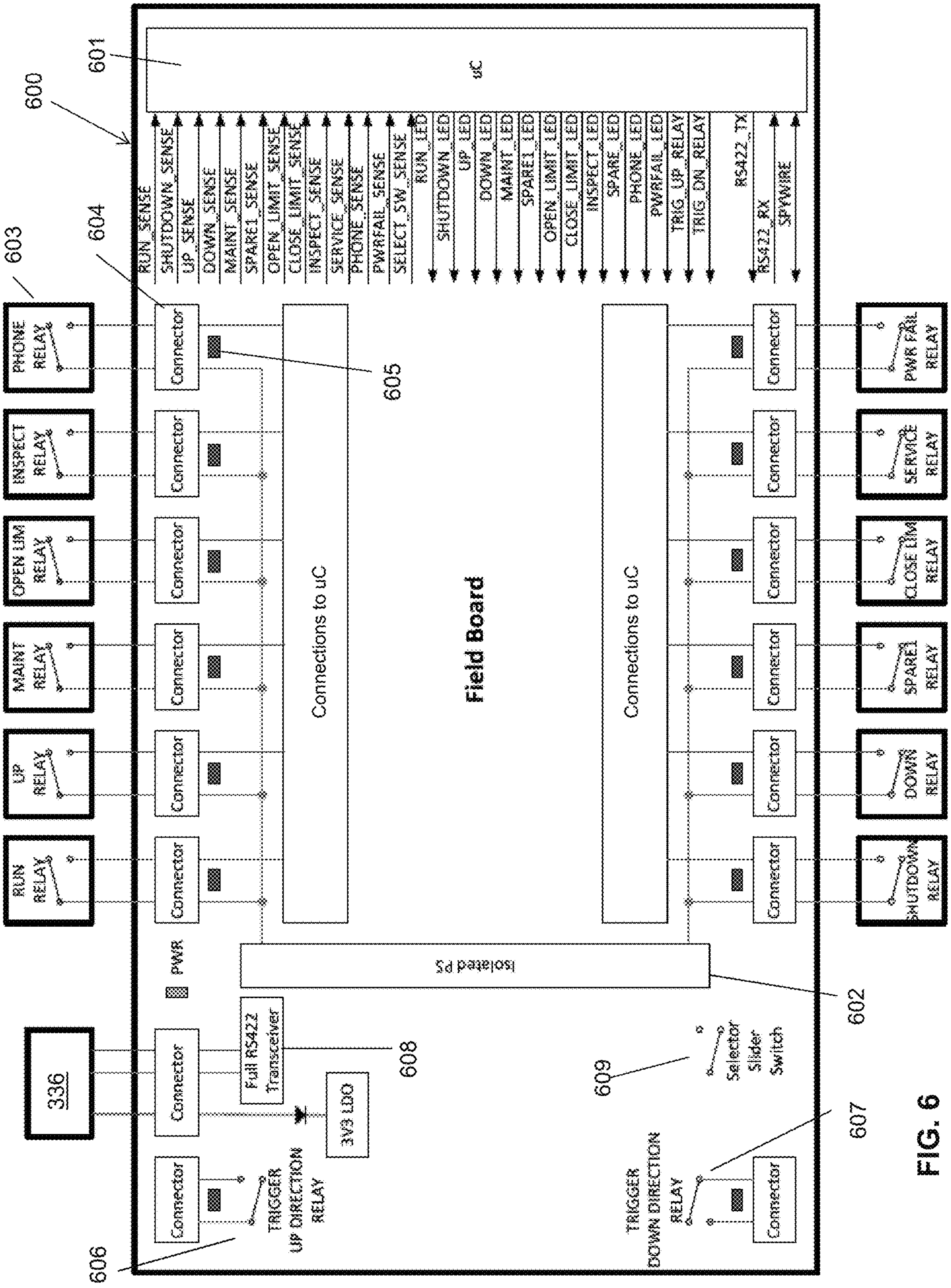
FIG. 6 is an example system diagram of a field board.

Turning to FIG. 6, an example of a field board 600 is shown. It includes a controller 601 (e.g. a microcontroller), a power supply 602, and a transceiver 608 for data communication with the computing platform device 336. The field board also includes multiple electrical relays that are controllable by digital electrical signals emitted by the controller 601. One or more of the electrical relays are connected to wires that connected to a given elevator controller or a given escalator controller. In this example, the field board 600 is configured to connect to an elevator controller.

The field board includes multiple connectors (e.g. multiple terminal blocks) that can connect to other relays that are external to the field board. These multiple connects are connected to the digital controller 601. For example, the external relays are part of the elevator controller. One or more of the external relays are part of other elevator systems, which may be separate from the elevator controller. For example, one of the relays includes a phone relay 603, which is electrically connected to electrical connectors 604, which are in turn connected to the controller 601. A light, such as an LED 605, indicates the states of the phone relay 603. For example, if the phone relay 603 is in the open position, then the LED 605 is off, and if the phone relay 603 is in the closed position, then the LED 605 is on. The phone relay 603, for example, is connected to two wires that connect to the field board, which are used to monitor the operation of the telephone in the elevator car. For example, the phone relay 603 can activate and the elevator is not running, the system denotes an elevator entrapment. Other examples of electrical relays that are used to sense the elevator operation include:

An inspection relay, service relay, and maintenance relay, which are used to monitor the status of the elevator operation, would ignore the shutdown relay because the elevator is presumed to be operated by an elevator mechanic.

An open limit relay and close limit relay, which are used to determine the status of the elevator door detects the condition of the elevator and is compared with the phone relay 603. If the phone relay 603 is active but the door open limit relay is on, then the system will not report an entrapment but it will report an elevator phone usage/emergency. However, if the door close limit relay is on, then an entrapment is reported.

An up relay and down relay, which is used to monitor the direction of the elevator. It is also used to determine if the elevator is working because an elevator would not run without an up or down direction.

A run relay, which is used to confirm that the elevator is operating. This relay is monitored to determine if the elevator or escalator is in operation. Many subsystems rely on this relay to determine if the system is working properly.

A power failure relay, which is used to determine if a power failure occurred is used to inform the system after restart why the system was not communicating.

A shutdown relay, which used to inform the computing platform device about the status of the elevator. It is an input received if a variety of contacts related to the operation of the elevator or escalator is true. The computing platform device, or the directly connected field board, gets this input from the elevator/escalator controller and once the input is high, the system monitors other inputs which would suggest if the elevator/escalator is back in operation. While this input is active, the shutdown counter is active and the software measures the down time for the system.

There may also be one or more spare relays, which can be connected to other wires of the elevator controller to control other functions of an elevator.

There is also a trigger up direction relay 606 and a trigger down direction relay 607 on the field board that are used to cause an elevator controller to electrically trigger the elevator to move up and move down, respectively.

For example, the trigger up direction relay 606 is connected to two wires that are connected to the top floor elevator call switch on the elevator controller. When the relay 606 is closed, an electrical signal causes the top floor elevator call switch to be activated, which in turn causes the elevator to travel to the top floor, if the elevator is functioning nominally. This process is herein called "poking". In the example of calling the elevator up using the field board relay 606, the field board poked the elevator to go up.

Similarly, the trigger down direction relay 607 is connected to two wires that are connected to the bottom floor elevator call switch on the elevator controller. When the relay 607 is closed, an electrical signal causes the bottom floor elevator call switch to be activated, which in turn causes the elevator to travel to the bottom floor, if the elevator is functioning nominally. In other words, the field board poked the elevator to go down.

Although two relays 606 and 607 are shown on the field board, in another example embodiment, the field board only includes one of these relays. Yet, in another example embodiment, the field board includes multiple other electrical relays to control different aspects of an elevator controller.

In an example embodiment, a selector control 609 (e.g. a slider or a switch or some other physical control) is included on the field board that allows the field board to work for either an elevator type controller or escalator type controller. In particular, it is recognized that a same given field board is operable to electrically connect either an elevator controller or an escalator controller, but is reconfigurable using the selector control 609. In particular, if the selector control 609 is physically put into an escalator mode, then the field board software operates to interpret the incoming data specifically for escalators. If the selector control 609 is physically put into an elevator mode, then the field board software operates to interpret the incoming data specifically for elevators.

In an example embodiment, the selector control 609 determines a binary value (e.g. a 0 or a 1) that represents the field board mode (e.g. escalator mode or elevator mode) and this binary value is transmitted along with other sensed data (e.g. including other binary data obtained from the other relay switches) to the computing platform device. The computing platform device uses the binary value representing the field board mode to determine and select the appropriate software to process the other sensed data. For example, if the computing device detects that the received binary value represents that the field board mode is in an elevator mode, then the computing platform device will apply elevator-specific software to process the other sensed data. Conversely, if the computing device detects that the received binary value represents that the field board mode is in an escalator mode, then the computing platform device will apply escalator-specific software to process the other sensed data.

Figure 7:
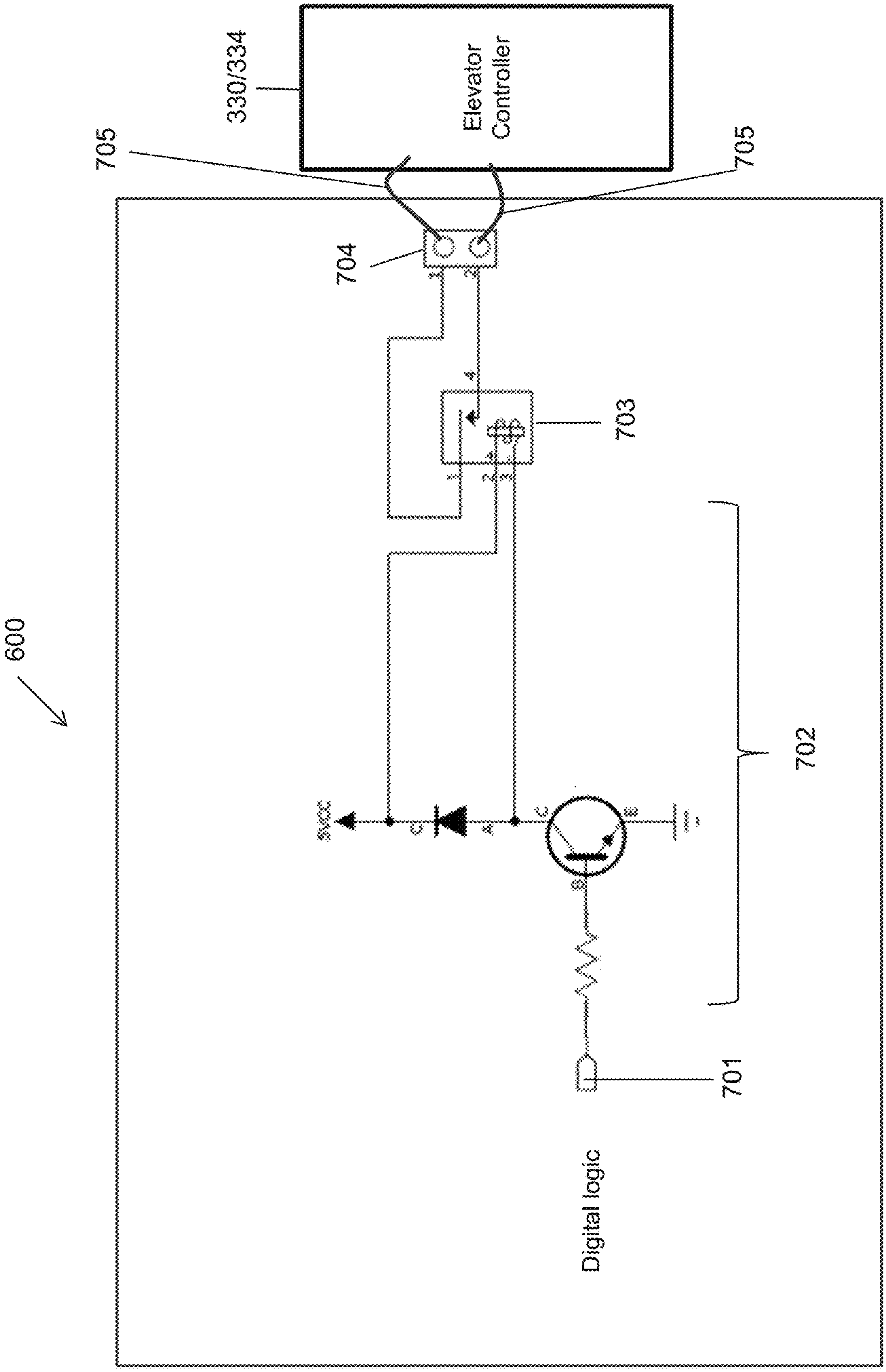
FIG. 7 is an example system diagram showing relay components of a given field board, which is in electrical connection with an elevator controller.

Turning to FIG. 7, an example of the circuit components to control a given relay are shown in isolation from the rest of the components on the field board 600.

A relay 703 open and closes a switch therein, and the leads of the switch are connected to a terminal block 704. Two wires 705 are connected to two electrical contacts on the terminal block 704. When the relay 703 is closed, the two wires are 705 are electrically connected together, and when the relay is open, the two wires 705 are electrically isolated. The two wires connect to a component on the elevator controller 330 or the escalator controller 334.

In an example embodiment, the terminal block includes screws, or spring cages, or Insulation Displacement Connections (IDCs), or a combination thereof to connect the wires to the terminal block. It will be appreciated that other types of connectors between wires and the field board can be used.

A digital logic signal 701 that is emitted by the controller 601 is used to control the relay 703, via other circuit components 702 (e.g. a transistor, a diode and a resistor).

It will be appreciated that the relay's wired connection to the elevator controller allows for direct electrical control of the elevator controller.

In an example implementation, a wire leading to a component (e.g. a switch or relay) in the elevator controller is cut and the two wire ends are connected to the terminal block 704. In another example implementation, two wires are respectively connected to two points in the elevator controller, and the other ends of those wires are connected to the terminal block 704; in this way an electrical by-pass is created when the relay 703 is closed. Other ways to use two wires to connect to the elevator controller are applicable, and may vary based on the electrical design of the controller. In other words, the two wire interface is very versatile when interacting with the elevator controller.

It will be appreciated that the relay interface with the two wires allows for the field board 600 to electrically connect and control certain aspects of the elevator controller, without interacting with the manufacturer's elevator system software. Therefore, even if the elevator controller's software is malfunctioning or there is an electrical failure in another part of the elevator system, the field board has direct electrical connectivity to cause the elevator controller to perform certain operations at a more rudimentary level (e.g. at the electrical switch level).

This type of direct electrical testing, including poking, is controlled remotely via the computing platform device 336, which is communication with the EMMM server 121.

Figure 8:
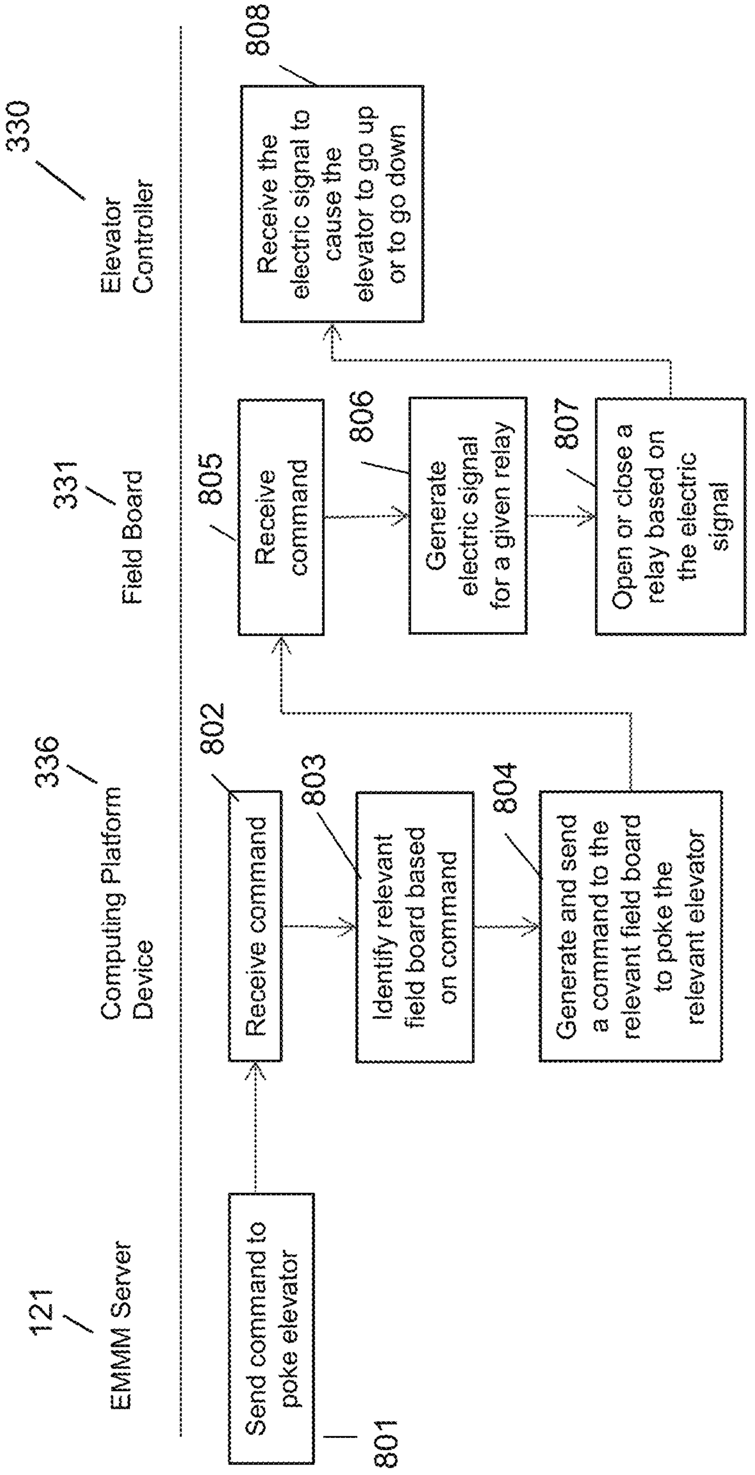
FIG. 8 is a flow diagram of example processor executable instructions for testing operation of an elevator.

Turning to FIG. 8, example executable instructions are provided for using a poking an elevator to go up or down. At block 801, the EMMM server 121 sends a command to poke the elevator and this command is received by the computing platform device 336 at block 802. For example, the command includes data that identifies the elevator controller or the relevant field board, or both, and the direction of travel for the elevator. At block 803, the computing platform device identifies the relevant field board based on the received command. At block 804, the computing platform device then generates and sends a command to the relevant field board to poke the relevant elevator.

At block 805, the relevant field board 331 receives the command from the computing platform device 336, and in response it generates an electric signal for a given relay (block 806). The given relay on the field board then opens or closes based on the electric signal (block 807). The opening or the closing of the relay in turn causes a change in the electrical signal in the elevator controller, which causes the elevator to go up or to go down (block 808).

In another example embodiment, the executable instructions on the computing platform device originate and generate the command to poke the elevator, instead of the EMMM server.

Figure 9:
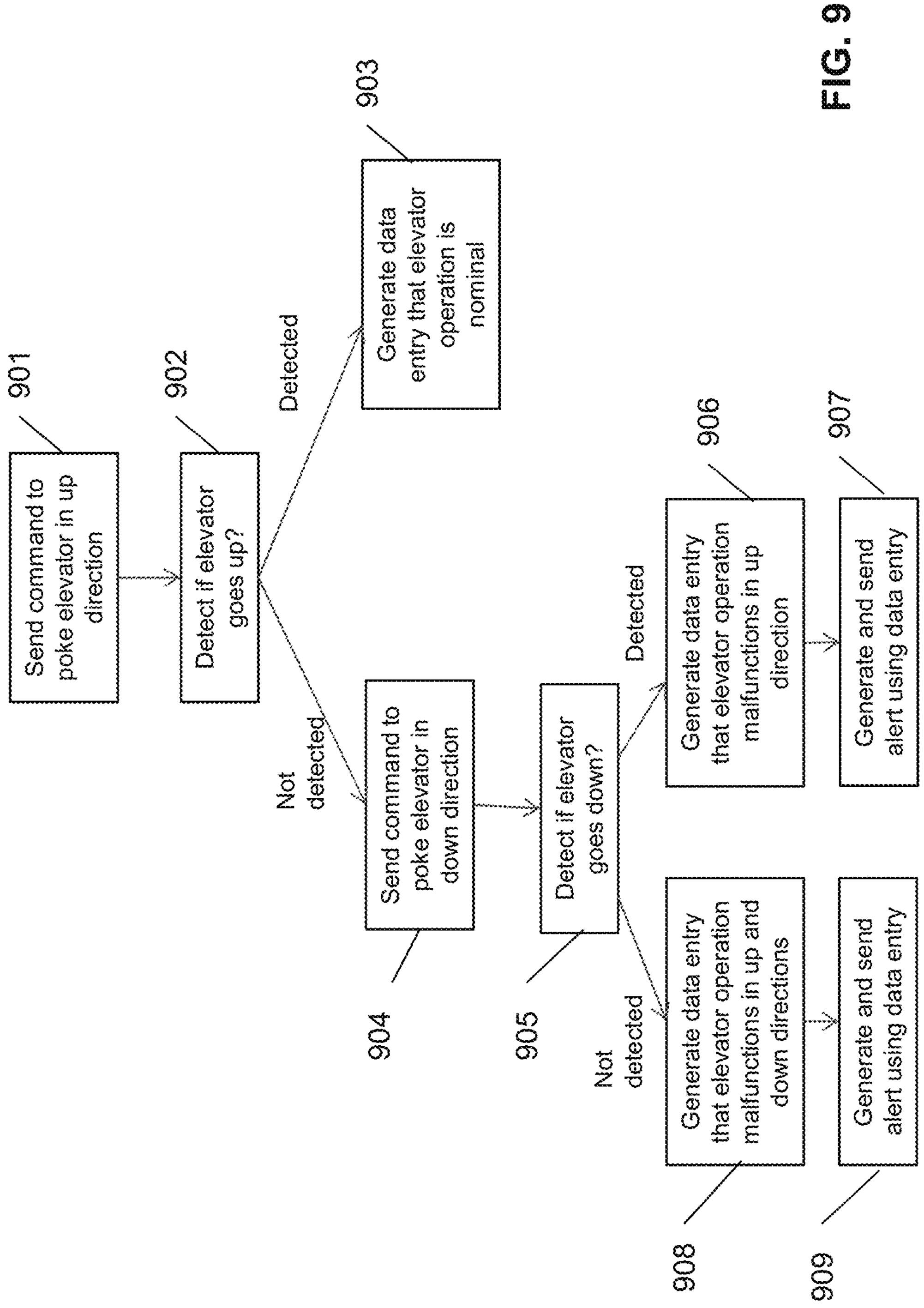
FIG. 9 is a flow diagram of example processor executable instructions for recording data and generating an alert message based on the testing of the elevator.

Turning to FIG. 9, executable instructions are provided to control the poking of the elevator. These instructions may be executed on the computing platform device or the EMMM server, or both. For the purpose of FIG. 9, one of, or both of, the computing platform device and the EMMM server are referred to as a computing device.

At block 901, a computing device sends a command to poke the elevator in the up direction. At block 902, the computing device, based on feedback from sensors or other the elevator controller itself, detects if the elevator is going up or not. If the upwards movement is detected, then the computing device generates a data entry that the elevator operation is nominal. At block 903, if the upwards movement is not detected, then the computing device sends a command to pike the elevator in the down direction (block 904). The computing device, based on feedback from sensors or the elevator controller itself, detects whether or not the elevator is moving down.

If downward movement is not detected, then at block 908 the computing device generates a data entry that the elevator operation is malfunctioning in the up and the down directions. The computing device also generates and sends a data alert using the information from the data entry (block 909). For example, the alert is transmitted to the devices belonging to a maintenance service and the building owner or manager.

If downward movement is detected, then the computing device generates a data entry that the elevator is malfunctioning in the up direction (block 906). An alert is also generated and transmitted based on this data entry (block 907).

Figure 10:
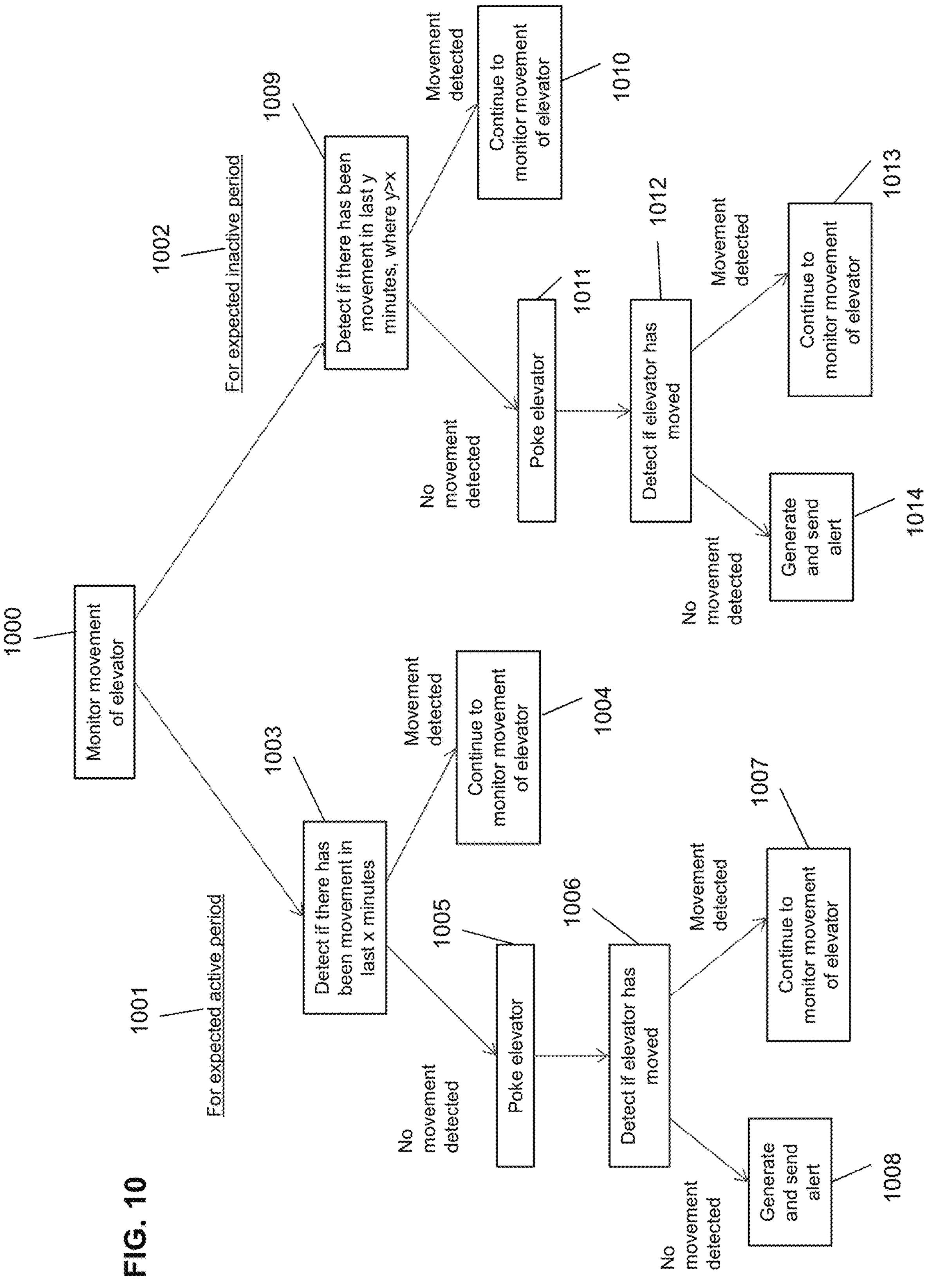
FIG. 10 is a flow diagram of example processor executable instructions for testing operation of an elevator according a schedule.

Turning to FIG. 10, executable instructions are provided to control the poking of the elevator. These instructions may be executed on the computing platform device or the EMMM server, or both. For the purpose of FIG. 10, one of, or both of, the computing platform device and the EMMM server are referred to as a computing device.

At block 1000, the computing device monitors movement of the elevator. The computing device also has a schedule that defines expected active periods of elevator usage (e.g. weekdays from 5 am to 10 pm) and expected inactive periods of elevator usage (e.g. weekends, weekdays between 10 pm-5 am). It will be appreciated that there may different active and inactive periods that reflect the location of the elevator (e.g. in a business building, manufacturing building, hospital, shopping mall, entertainment building, etc.).

If the current time is within an expected active period according to an electronic schedule, then a certain set of operations 1001 are performed. In particular, the computing device detects if there has been movement in the last x minutes (block 1003).

If movement has been detected in the last x minutes, then the computing device continues to monitor movement of the elevator (block 1004).

If movement has not been detected in the last x minutes, then the computing device initiates a poking command to poke the elevator (e.g. to move up or to move down) (block 1005). The computing device then detects whether or not the elevator has moved in response to the poking (block 1006). If movement is detected, then the computing device continues to monitor movement of the elevator (block 1007). In other words, the elevator is operating nominally, and no one has used the elevator in the last x minutes.

On the other hand if no movement is detected responsive to the poking, then the computing device generates and transmits an alert message (e.g. to the service provider, to a technician, to the building manager, etc.) (block 1008). The alert message indicates that the elevator is not working.

In this way, the poking is used to actively and remotely determine whether an elevator is operational, and to automatically transmit an alert that will trigger dispatching a service technician, potentially even before complaints from people are made.

If the current time is within an expected inactive time period, as per the electronic schedule, then another set of instructions 1002 are executed. In particular, instructions in blocks 1009, 1010, 1011, 1012, 1013 and 1014 are similar those under operations 1001, but the computing device detects if there has been movement in the last y minutes instead of x minutes, where y>x. In other words, during inactive periods, the computing device pokes the elevator after a longer period of detected inactivity.

The poking process is also used to help determine if there is a potential security breach, such as when an unauthorized person purposely waits in an elevator car until the elevator car is called up to a secure floor, which is only available to an authorized person. This behaviour is called "scoping".

Figure 11:
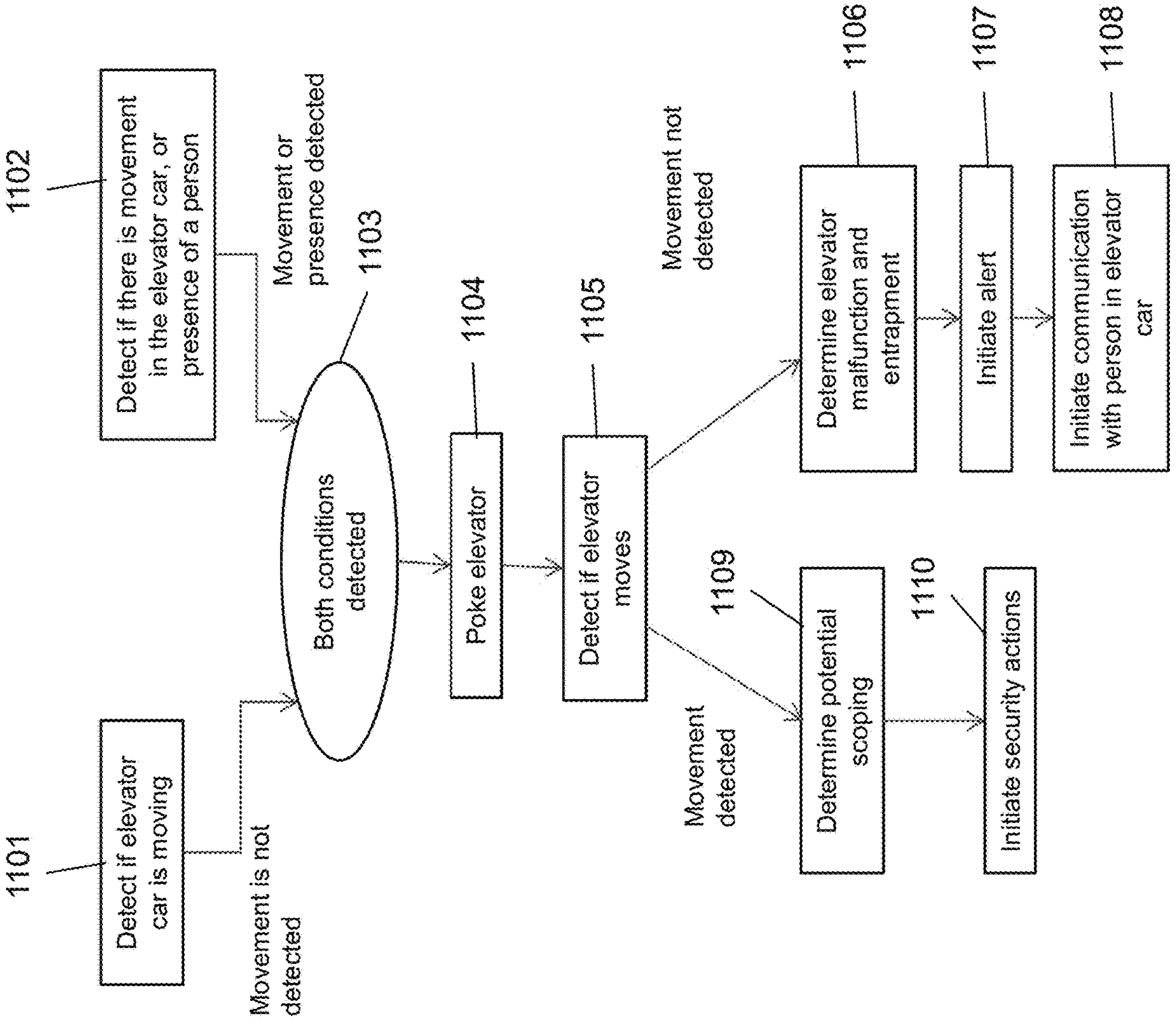
FIG. 11 is a flow diagram of example processor executable instructions for actively determining a security incident or an entrapment incident by testing operation of an elevator.

Turning to FIG. 11, executable instructions are provided to use poking of the elevator to determine if an unauthorized person is scoping. These instructions may be executed on the computing platform device or the EMMM server, or both. For the purpose of FIG. 11, one of, or both of, the computing platform device and the EMMM server are referred to as a computing device.

At block 1101, the computing device detects if the elevator car is moving. At block 1102, the computing device also detects if there is a person in the elevator car, for example, by using sensors within the elevator car. If movement of the elevator car is not detected, and the presence of the person in the elevator car is detected (as per block 1103), then the computing device pokes the elevator (block 1104). Responsive to the poking command, the computing device detects whether or not the elevator has moved (block 1105).

If movement of the elevator car is not detected, then the computing device determines that the elevator has malfunctioned and that a person is trapped in the elevator car (also called entrapment) (block 1106). The computing device initiates and transmits an alert message, for example, to the service provider, the building manager, a technician, etc. (block 1107). The computing device also initiates communication with the person in the elevator car (block 1108)

using the communication device within the elevator car. The communication message may be an automated message that is visual or audio, or both. The communication message may, either in addition or in the alternative, be a real-time audio connection with another person (e.g. a building manager, security person, etc.).

Following block 1105, if movement of the elevator car is detected responsive to the poking, then the computing device determines that there is a potential scoping situation (block 1109). The computing device then initiates one or more security actions (block 1110). For example, the security action includes transmitting a security alert to a security guard with an image of the person in the elevator car that is potentially scoping (e.g. where the image is captured from a camera within the elevator car). In another example, the security action includes prohibiting the elevator car to access any of the secure floors. In another example, the security action includes communicating with the person in the elevator over the communication device. For example, it is also possible that a person is incapacitated in an elevator car, rather than scoping, and activating two-way communication will help do determine the state of the person. It will be appreciated that other security actions are applicable.

Figure 12:
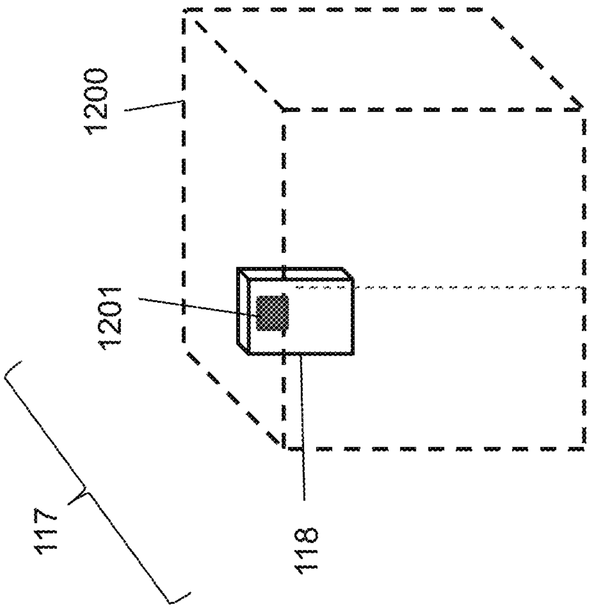
FIG. 12 is an example schematic showing a placement of a field board in a housing of an elevator controller, and the field board including a temperature sensor.

Turning to FIG. 12, in another example embodiment, a housing 1200 of an elevator controller 117 is shown. The field board 118 is mounted within the housing 1200 and near or at the top of housing 1200. In another example, the field board is mounted in the upper half portion within the housing 1200. The field board is equipped with a temperature sensor 1201. The temperature sensor 1201 is used to measure the air temperature within the housing 1200, in order to detect a potential failure or an actual failure in the elevator controller. The field board is mounted higher within the housing since warm air rises and it is desirable to detect the hot air temperature. In particular, it is herein recognized that if the air temperature within the housing 1200 is above a certain temperature, then the elevator controller is potentially malfunctioning or has malfunctioned, or will malfunction.

Figure 13:
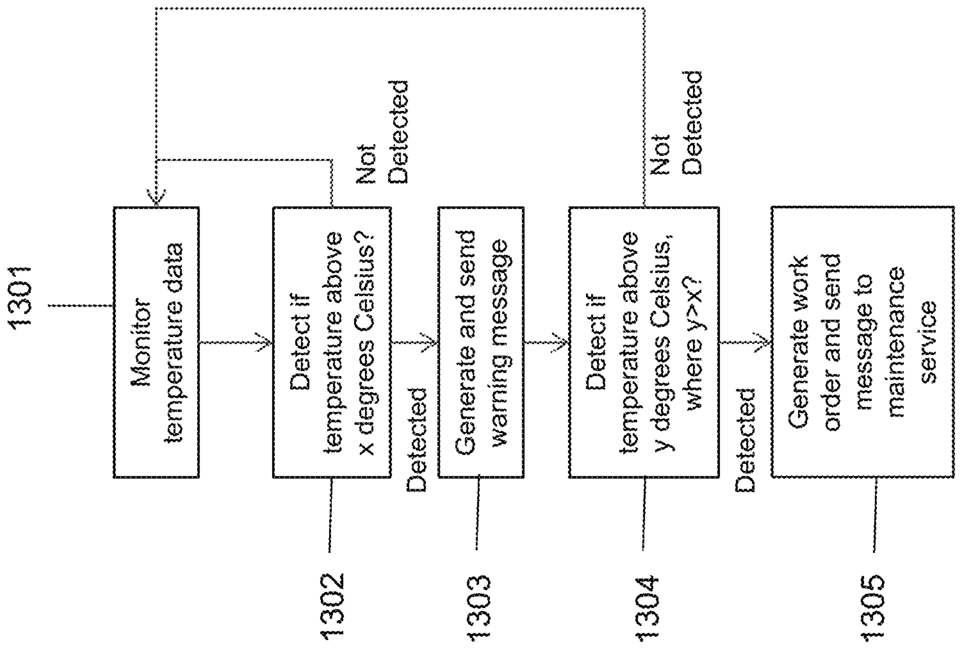
FIG. 13 is a flow diagram of example processor executable instructions for monitoring temperature within the housing of the elevator controller, and generating a message based on the detected temperature.

Turning to FIG. 13, executable instructions are provided to monitor temperature data of the air within the housing 1200. These instructions may be executed on the computing platform device or the EMMM server, or both. For the purpose of FIG. 13, one of, or both of, the computing platform device and the EMMM server are referred to as a computing device.

At block 1301, the computing device monitors temperature data that is measured by the temperature sensor 1201 on the field board 118. At block 1302, the computing device detects if the temperature is above x degrees Celsius. If the temperature is not above x degrees Celsius, then temperature monitoring continues. On the other hand, if the temperature is above x degrees Celsius, where x is a number, then the computing device generates and sends a warning message (block 1303), for example, to a service provider, a technician, a building manager, etc. For example, the warning message is a text message, an email, a telephone call, a message in a software application, or some other communication media that communicates that the temperature in the elevator controller is too high. The message could also indicate, for example, that the high temperature indicates a potential malfunction, or an actual malfunction, or that a malfunction could occur.

If the computing device detects an even higher temperature of y degrees Celsius, where y is a number greater than x (block 1304), then the computing device automatically generates a work order and sends a message and the work order to the service provider to provide maintenance to the elevator controller.

In a non-limiting example embodiment, x is 28 degrees Celsius and y is 30 degrees Celsius. However, other temperatures may be used to trigger the message alerts.

It will also be appreciated that other actions can be automatically executed by the computing device in response to detecting a high temperature. For example, the computing device may stop operation of the elevator.

Other aspects of the EMMM server and its monitoring capabilities are described below.

Figure 14:
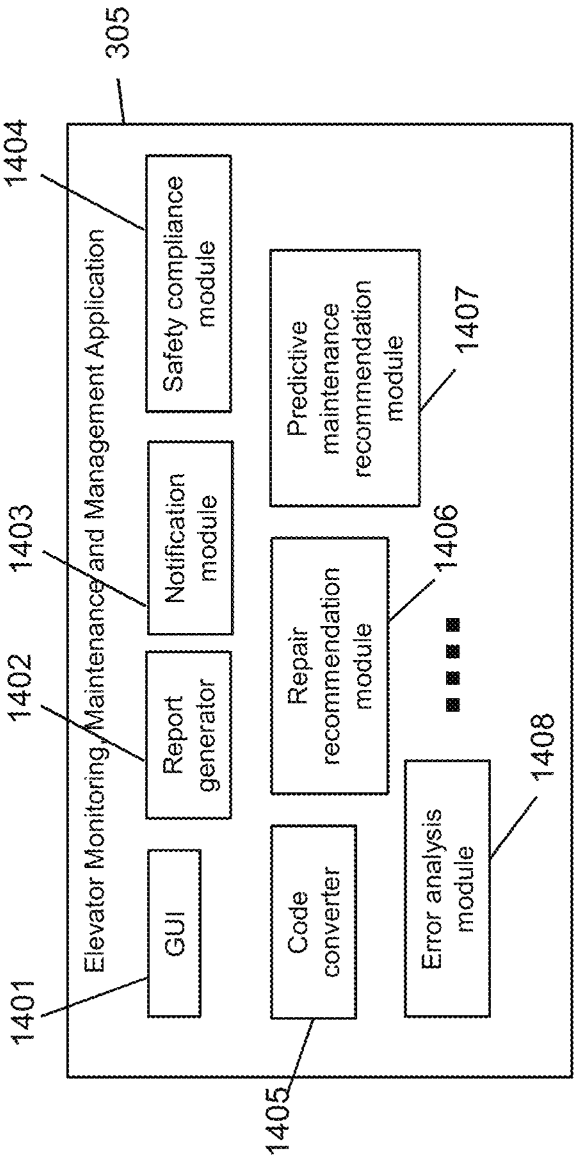
FIG. 14 is a block diagram showing example components of an EMMM application on the EMMM server.

Turning to FIG. 14, example components of the EMMM application 305 are shown, including: a graphical user interface (GUI) 1401, a report generator 1402, a notification module 1403, a safety compliance module 1404, a code converter 1405, a repair recommendation module 1406, a predictive maintenance recommendation module 1407, and an error analysis module 1408. The GUI 1401 generates GUIs, example aspects of which are shown in the figures. The report generator compiles data and automatically generates reports, which may be viewed via the GUI and also sent to other computing devices or servers, or both. The notification module generates and sends notifications to other computing devices or servers, or both. The safety compliance module tracks inspections and inspection orders, and automatically generates and sends reminders if inspection orders are not complete by a certain date. The code converter is manages and maps the databases of error codes that are specific to each of the service providers, and is able to convert these specific error codes in the service provider format to an EMMM format. The EMMM format is used throughout the system to provide uniformity and consistency to the users. The repair recommendation module includes computing processes to analyze the elevator data and recommend repairs to an elevator. The predictive maintenance module includes computing processes to analyze the elevator data and output maintenance actions and timelines in anticipation of elevator wear and elevator technical failure. The error analysis module includes computing processes to analyse the elevator data and output root problems of an elevator. The root problems may be technical. In another example, the root problems may also include human error (e.g. incorrect repairs, late maintenance, untimely response to elevator emergency, etc.).

Figure 15:
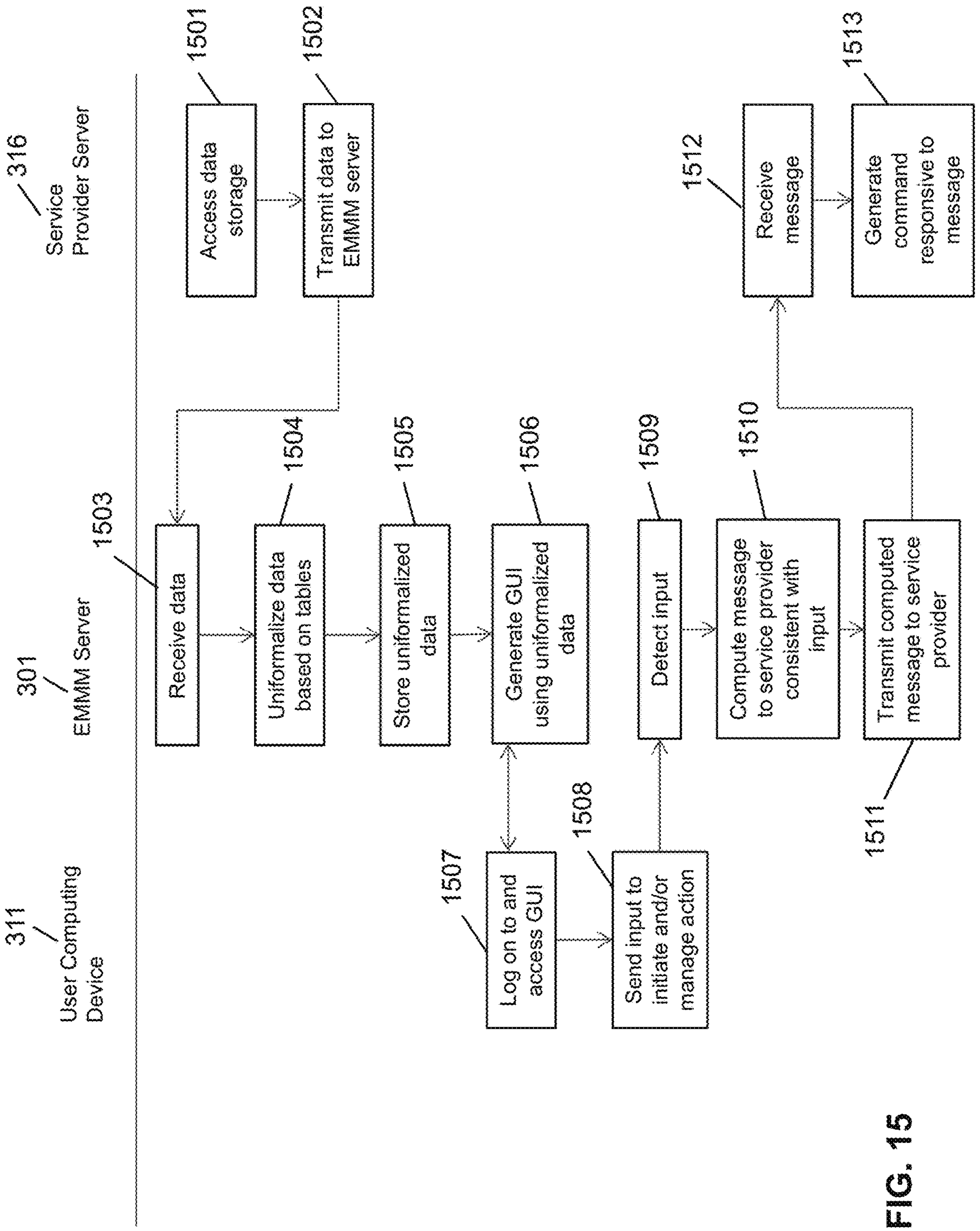
FIG. 15 is a flow diagram of example computer executable instructions for a data retrieval process of data from a service provider server.

With reference to FIG. 15, example computer executable instructions are provided for data retrieval and uniformalization of elevator/escalator (referred to generally as "elevator") maintenance and callback data. FIG. 15 relates to service providers that provide maintenance and standby on call service. The service providers perform standard maintenance, and store the maintenance information on the service provider's data storage. Furthermore, the service provider may be called ("service call") by the user to rectify an issue with an elevating device, in which case the service provider will repair the elevator, and again store the service call information on the service provider's data storage. There is therefore information on both i) maintenance and ii) service calls on the service provider's data storage. The service provider has a web application that allows a user to log in and track the information and status of the maintenance and service call completed by the service provider. At block 1501 a given service provider server accesses their data storage, and transmits that data to the EMMM server (block 1502), for example, via a web services application. The EMMM server receives the data (block 1503), and then uniformalizes the data based on table mappings (block 1504). The processed data is therefore in an EMMM format, which stored on the EMMM server (block 1505). For example, in the data retrieval and uniformalization process, the information using XML webservices is retrieved, uniformalized and stored on the database 310. At block 1506, the EMMM server generates a GUI and populates the GUI with the uniformalized data for display. For example, an end user can view the GUI through a web application usable on a computing device 311. In particular, the user computing device logs on to the EMMM server website or application portal to access the GUI (block 1507). Through the GUI, the user computing device sends inputs to initiate an action or manage an action, or both (block 1508). The actions include, for example, initiating and controlling callback. The EMMM server detects the input (block 509), computes a message to a service provider that is consistent with the input (block 1510) and transmits the computed message to the service provider server (block 1511). At block 1512, the service provider server receives the message, and then generates a command responsive to the message (block 1513). The command, for example, is to send a message to a technician to go to the location of elevator to execute a repair or perform an inspection, or both.

Figure 16:
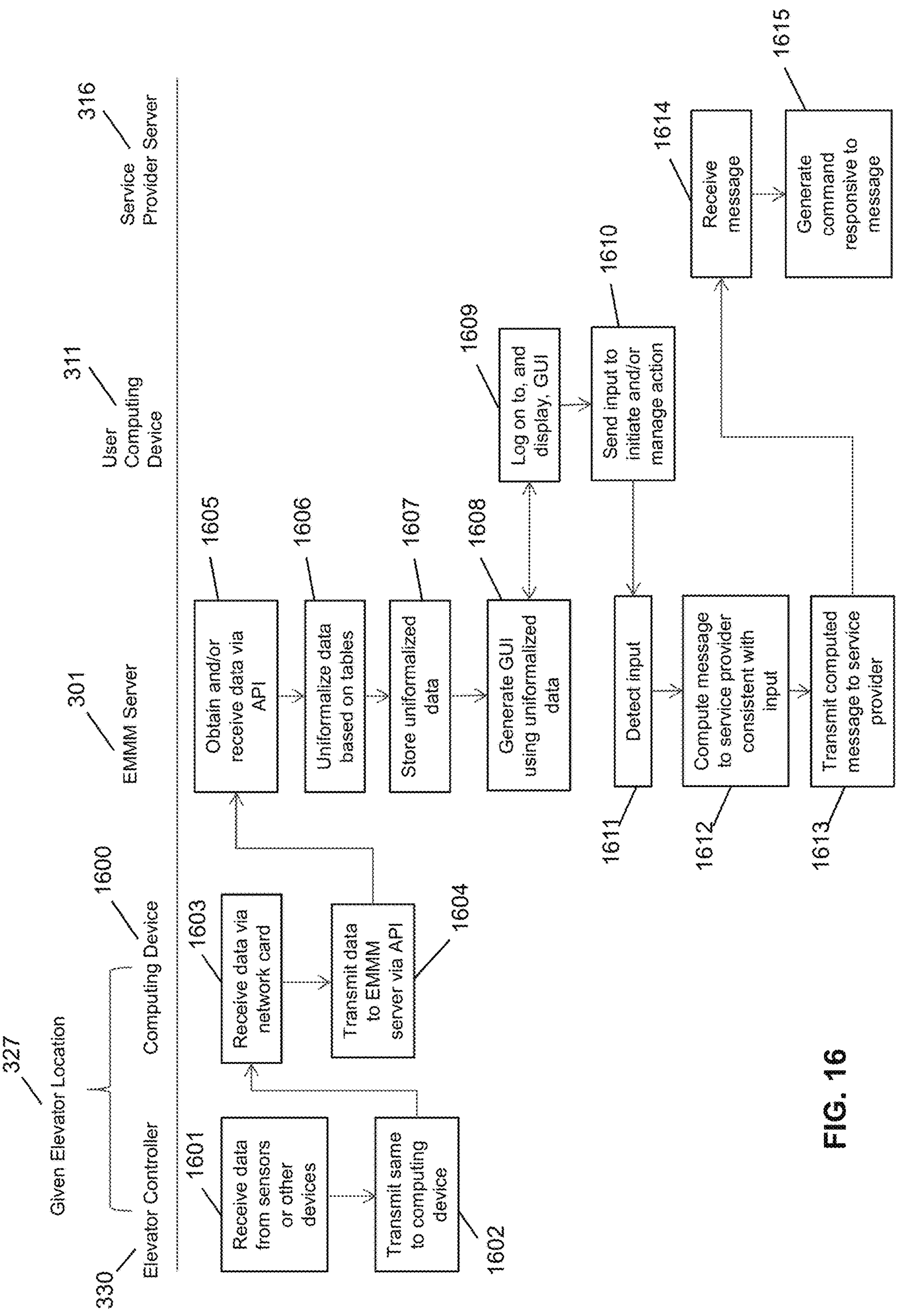
FIG. 16 is a flow diagram of example computer executable instructions for a data retrieval process of data from an elevator controller.

With reference to FIG. 16, another example embodiment of computer executable instructions is provided for retrieving and processing data obtained from an elevator controller. Elevator controllers, which are devices built by disparate manufacturers, are installed on the machine room and control the operation of the elevator. The controllers collect and store data regarding the performance and service of each of the elevating devices, such as storing code events. Examples of code events are Heat Detectors, Recall Activated, Landing System Sensor Fault and Emergency Power Activated. A user can see events or codes for an elevator from a computer which has a direct connection to the controller.

An example of the system receives code events using XML webservices and stores them in the database and uniformalizes them.

In the example of FIG. 16, a computing device 1600 is in communication with the elevator controller 330 and is generally located at the same location (e.g. same building). This computing device 1600, for example, is ancillary to the computing platform device 336. The computing device includes a processor, a communication device for communicating over the network 120, and memory. The memory includes a manufacturer application for interpreting and logging the data, and an API for interacting with the EMMM server 121. In an alternative example embodiment, the functions of the computing device 1600 are performed by the computing platform device 336 and, thus, the computing device 1600 and the computing platform device 336 are one and the same.

In FIG. 16, at block 1601, an elevator controller receives data from sensors and other devices. At block 1602, the elevator controller transmits the data to the computing device 1600 connected to the controller. At block 1603, the computing device receives the data via a network card and then transmits the same to the EMMM server (block 1604).

At block 1605, the EMMM server obtains the data via the API, and the data is processed and stored in an EMMM format (blocks 1606 and 1607). The uniformalization includes the EMMM server using a look up table that maps specified codes and data to EMMM codes and data. At block 1608, the EMMM server generates a GUI using the EMMM formatted data. At block 1609, a user computing device is used to log on to and display the GUI. At block 1610, the user computing device detects user input and sends the input to initiate or manage, or both, an action. At block 1611, the EMMM server detects this input and then computes a message to the service provider consistent with the input (block 1612). This message is transmitted to the service provider server (block 1613). The service provider server receives this message and generates a command responsive to the message (blocks 1614 and 1615).

Any number of various elevator controllers store code events through its connection with the elevator sensors. The code events stored in the manufacturer controller are transmittable to a remote computer via a manufacturer network card. A manufacturer application and API would generally be installed to allow remote access by the user. The manufacturer application and API transmit data to web services application. As noted above, the EMMM server retrieves the data from the network via the web services application. The data is uniformalized and stored. The uniformalized data may be presented through an intuitive web application, such as in the GUI. The end user sees data regarding the code events that have been created by an elevator.

Figure 17:
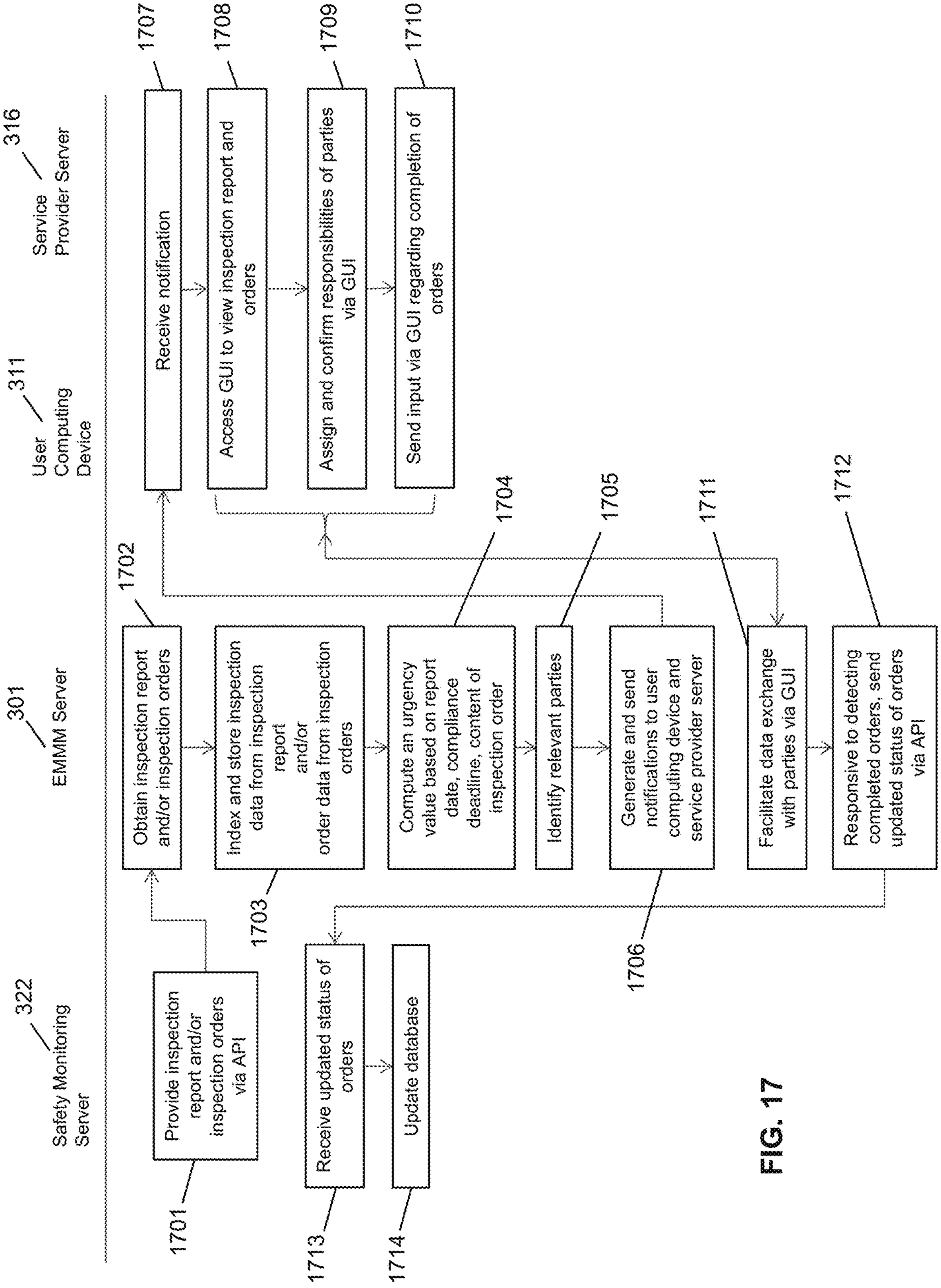
FIG. 17 is a flow diagram of example computer executable instructions for managing inspection orders.

FIG. 17 shows example computer executable instructions for managing an inspection process. At block 1701, the safety monitoring server provides an inspection report or inspection orders, or both, via an API. At block 1702, the EMMM server obtains the inspection report or inspection orders, or both. At block 1703, the EMMM server indexes and stores the inspection data from the inspection or the order data from the inspection orders, or both. The inspection order includes an identifier of the facility owner, the date of inspection, and one or more identifiers of the elevators (e.g. elevator cars A and B in location A). The inspection orders may include an issue date identifying the date at which the order was issued by the safety monitoring server, and a deadline date identifying the deadline at which the order is to be completed. The order may also include a regulation code or regulation identifier that refers to a specific regulation or rule. The order includes text that identifies an action to be performed by the facility owner or the service provider contracted by the facility owner. The text in the order may also include components of the elevator that require repair, monitoring or maintenance. It will be appreciated that the data items in an inspection order or inspection report, or both, may vary from what is described above.

The EMMM processes this data. For example, the data items are itemized and indexed and compared against rules and other values. In another example, the text is analysed using natural language processing to determine actions and relevant components of the elevator system.

At block 1704, the EMMM server computes an urgency value based on a number of factors, including one or more of: the date that the report was issued, the compliance deadline date, the current date, and the content of the inspection order. For example, if the compliance deadline is approaching, then the urgency value is higher. If the text content of the inspection order indicates that an action is not critical to the safety or function, then the urgency value is lower. Otherwise, if the text content indicates that an action or a component is critical to the safety and function of the elevator, then the urgency value is higher.

At block 1705, the EMMM server identifies the relevant parties and their contact information from a database stored on the EMMM server. At block 1706, the EMMM server then generates or compiles notifications, and sends these notifications to the identified parties (e.g. a user computing device of the facility owner, and a server of the service provider).

A number of operations (blocks 1707 to 1710) may be performed by one of the user computing device 311 and the service provider server 316, or both. These operations include an exchange of data with the EMMM server via a GUI (block 1711). In particular, one or both of the user computing device and the service provider server execute the following instructions: receive the notification (block 1707); access the GUI to view the inspection report and orders (block 708); assign and confirm responsibilities of parties via the GUI (block 1709); and send an input via the GUI regarding completion of orders (block 1710). Responsive to the EMMM server detecting the completed orders, the EMMM server sends an updated status of the inspection orders to the safety monitoring server via an API (block 1712).

In an example embodiment, the EMMM server sends reminders to the user computing device or the service provider server, or both, if the order status is not completed.

At block 1713, the safety monitoring server receives the updated status of the orders and updates its own database (block 1714).

With reference to FIGS. 18*a* to 18*c* and to FIGS. 19*a* to 19*c*, example datasets are shown from databases stored in the EMMM server. In FIG. 18*a*, table Activities contains activities having a unique activity id 102, a company id 104, a location id 106 which is tagged to the location of the elevating device, and a device id 108, to identify a unique elevating device. The maintenance information is stored in the form of work description 110, repair description 112, the entered and completion dates 114, 116 and the work order number 118. The invoicing information may be contained as invoice number 120, estimated cost 122 and actual cost 124. The callback information includes a callback id 123, directive code 125, deficiency number 126, government-mandated code 127, counter 128 for the number of occurrences, and billable 129 that determines whether the hours are billable or not.

In FIG. 18*b*, table Activity Labour contains a unique labour id 130, the name of the mechanic 132, the ticket number 134, the hours spent at various rates per hour (regular hour, half hour, overtime and travel hours) 136, as well as time spent at nonbillable activities 138.

In FIG. 18*c*, table Activity Parts provides information on the parts used for the elevator repair. The part id 140 is a unique identifier, and also includes a SKU number 142, OEM field 144, and the name and manufacturer of the part 146, 148, along with quantity of parts 150, description 152 and price 154.

In FIG. 9*a*, table Callbacks includes callback ID 156 for a unique record ID, device ID 158 to uniquely identify a device, a unique call code 160, call code 162, company callback ID 164, company ID 166, information regarding about the problem that occurred such as who entered the problem 168, the date, time and description of the problem 169, dispatch time 170, the call status 171 (including call status and call close time and date), mechanic arrive time 172, information regarding billable hours 174, as well as other information regarding updates of the system 176 such as who updated it or when the update occurred.

In FIG. 19*b*, table Callback Time contains time 178, callback ID 156, dispatch time 170, and mechanic arrive time 172 to determine the responsiveness of the mechanic's call.

In FIG. 19*c*, table Call Codes contains call code 162, a further call code 160 to map the service provider code with business partner code and uniformalize the data, company ID 166, and part name 182 to produce the call codes.

With reference to FIG. 20*a*, an example of an XML string being transmitted from a computing device 1600 connected to a controller, to the EMMM server 301 is shown. In this example, the XML string transmits data on the building ID 185, which is a unique identifier of the building, row ID 186 of the table, the manufacturer ID 187 of the elevating device, the dispatcher ID 188, the car ID 189, a car name 190 for the elevating device, a date stamp 192, an event ID 193 which uniquely identifies the occurrence, along with the floor 195 where the incident occurred, and whether the event was confirmed 196.

In FIG. 20*b*, an example embodiment of data conversion or uniformalization is shown, wherein the data from the XML string is uniformalized into tables of the datastore, in this example of the Building Events Table. The buildingid field is placed into the BuildingId field, the manufactureid into the ManufactureId field, and so on.

In FIG. 20*c*, an example of the data types of the Building Events Table is shown. These fields in the table have data restrictions. For example, BuildingId is an integer, while RowId is a big integer, and CarId is a small integer and comment is a 255-character field that can hold various characters. In the data conversion process the data from the XML file is received and entered into the fields within the datastore's tables, under the restrictions of the various fields of the tables. Fields may be limited in different ways (such as varchar [127] or int [3]), and where the data does not fit, it is truncated or converted before being inserted into the database. For example, varchar [255] will be truncated to fit varchar [127], and a decimal number will be rounded to fit an integer data slot. In this way, the data is uniformalized into a single database. In an embodiment, inconsistencies of the field naming convention between the XML (representing the manufacturer's specification) and the tables of the datastore are resolved by means of a mapping table, wherein the names used by the XML incoming data are matched to the correct fields of the datastore.

The EMMM server also identifies critical time periods of an elevator and, based on whether or not the current time is within a critical time period, the EMMM server executes different sets of computations. A critical time period for an elevator is a time period during which an elevator is being used frequently by many people. Based on the type building in which a given elevator is located, the date, and other factors, for example, the EMMM server is able to automatically determine the critical time periods for the elevator. For example, the EMMM server uses rules to conclude that, if the building is a business building, then the critical time periods are on the weekdays in the morning hours, the lunch time hours and afternoon hours. If the building is a residential building, then the critical time periods are in the morning hours and the afternoon hours on weekdays.

Figure 21:
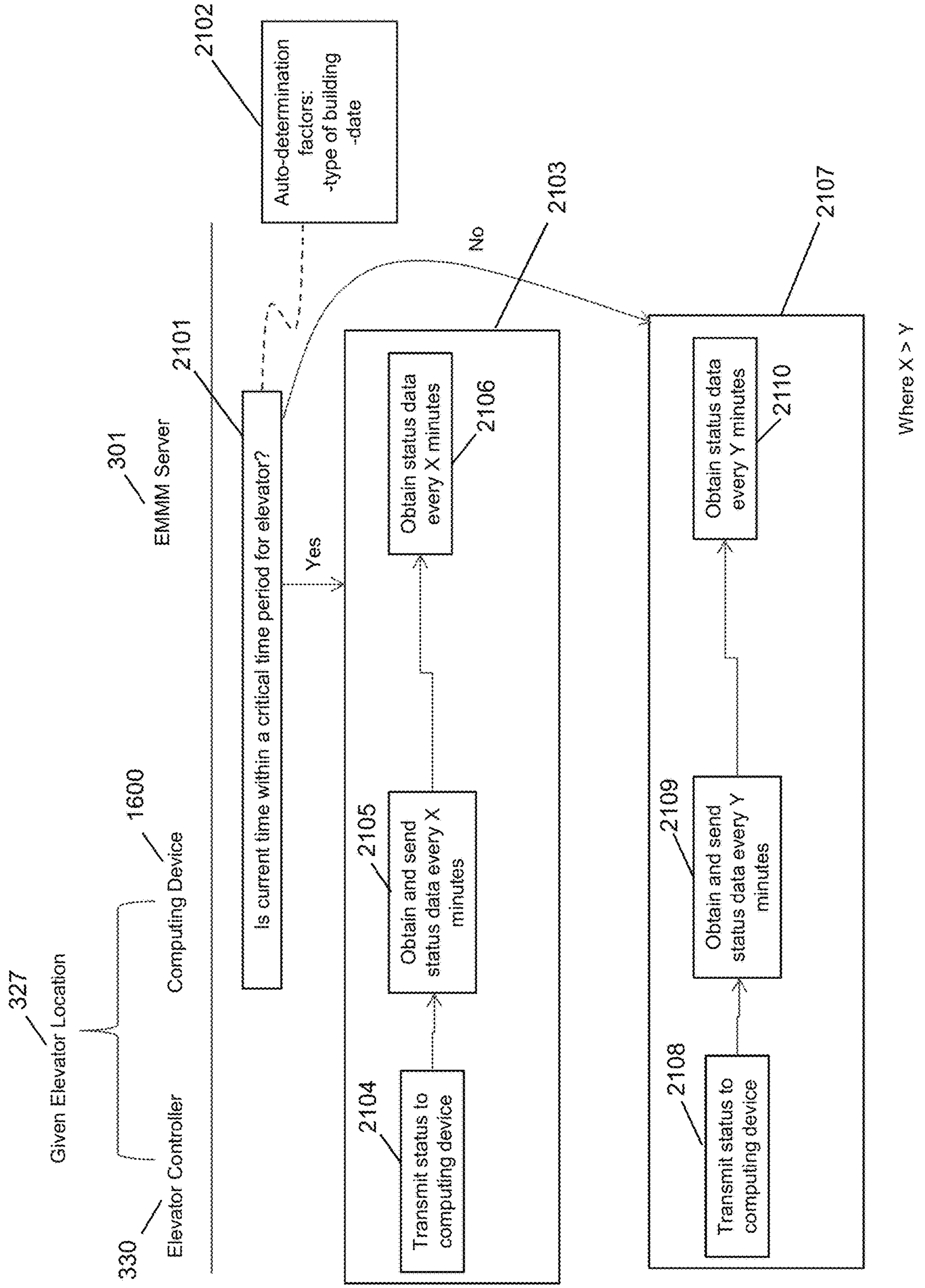
FIG. 21 is a flow diagram of example computer executable instructions for adjusting executable instructions based on a critical time period.

FIG. 21 shows example computer executable instructions for adjusting the executed instructions for the EMMM server 301 or the computing device 1600 connected to the controller, based on a critical time period. At block 2101, at least one of the computing device 1600 and the EMMM server 301 determine if the current time is within a critical time period for a given elevator. In an example embodiment, the EMMM server automatically determines the critical time periods based on one or more factors, including the type of building, and the current date (block 2102). In another example, the critical time periods may be inputted by a user or modified by a user.

If the current time is within a critical time period, then operations 2103 are executed. These include the elevator controller transmitting status information of the given elevator to the computing device every X minutes (block 2104), the computing device obtaining and sending this information to the EMMM server every X minutes (block 2105), and the EMMM server obtaining the status information from the computing device every X minutes (block 2106). X is a number, and may be a decimal number.

If the current time period is not within a critical time period, then different operation 2107 are executed: blocks 2108, 2109 and 2110. These are similar to blocks 2104, 2105 and 2106, but the data is obtained every Y minutes. Y is a number (e.g. a decimal number) that is less than X. In other words, if the current time is not in a critical time period, then the EMMM server obtains the elevator data less often. While if the current time is in a critical time period, then the EMMM server obtains the elevator data more frequently. In this way, if an error occurred, it would be more quickly reported to the facility owner and the service provider during a critical time period.

Figure 22:
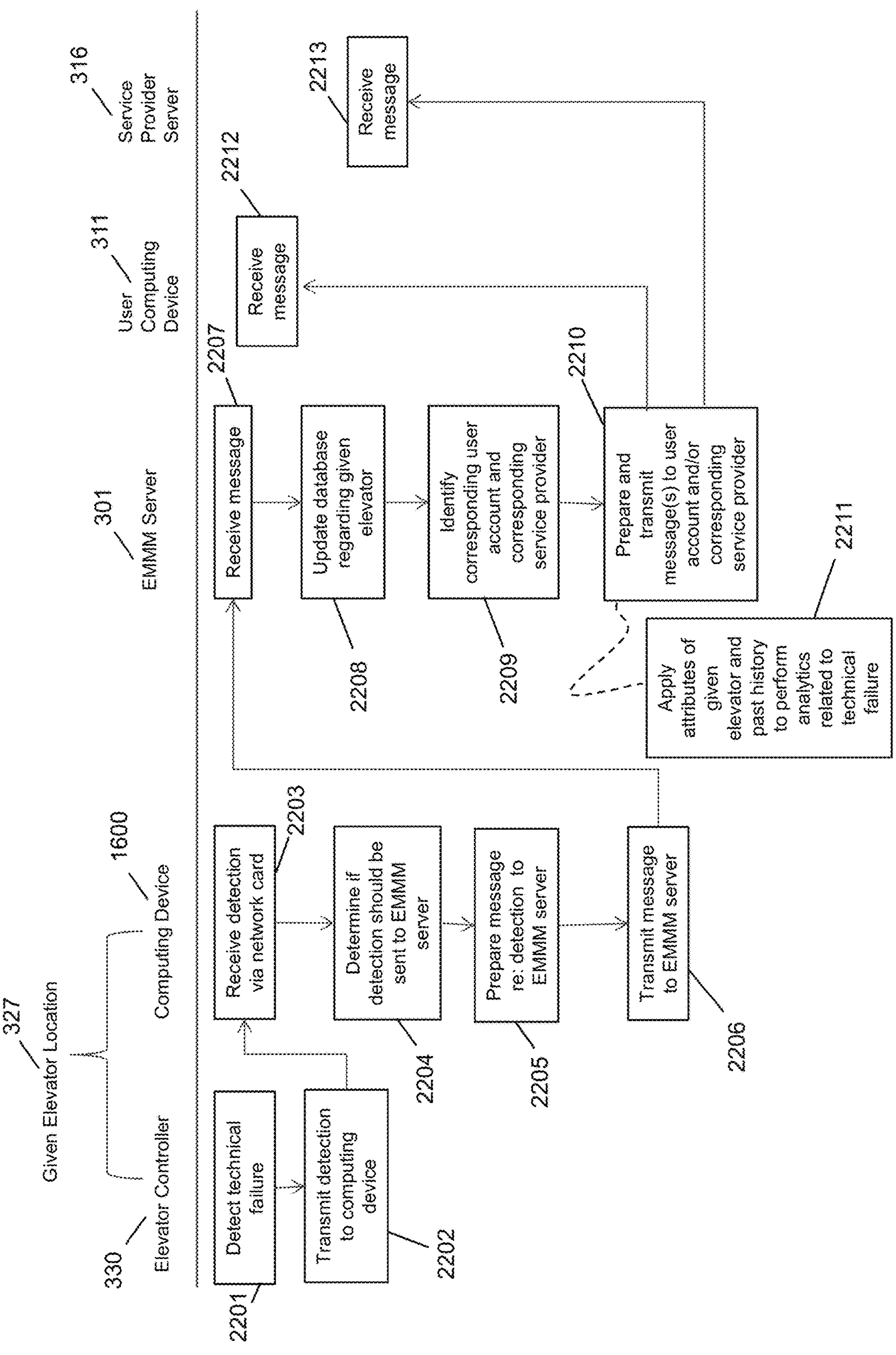
FIG. 22 is a flow diagram of example computer executable instructions for responding to a technical failure of an elevator.

Turning to FIG. 22, example computer executable instructions are provided for transmitting notifications of a technical failure. At block 2201, the elevator controller 330 detects technical failure and then transmits the detection to the computing device 1600 (block 2202). The computing device receives the detection via the network card (block 2203) and determines if the detection should be sent to the EMMM server (block 2204). The determination may be made according to one or more different computing algorithms.

If the computing device determines the detection should be sent, then at block 2205 the computing device compiles a message regarding the detection to the EMMM server. The message is transmitted at block 2206.

The EMMM server receives the message (block 2207) and updates the database regarding the given elevator (block 2208). The EMMM server identifies the corresponding user account of the facility owner and the corresponding service provider of the given elevator (block 2209). At block 2210, the EMMM server prepares and transmits one or more messages to the user account (e.g. the user's computing device) and the corresponding service provider (e.g. the service provider's server). At block 2211, the EMMM server may optionally apply attributes of the given elevator, the received message, and the past history of the given elevator to perform analytics related to the technical failure.

At blocks 2212 and 2213, the user computing device 311 and the service provider server 316 respectively receive the message from the EMMM server.

Figure 23:
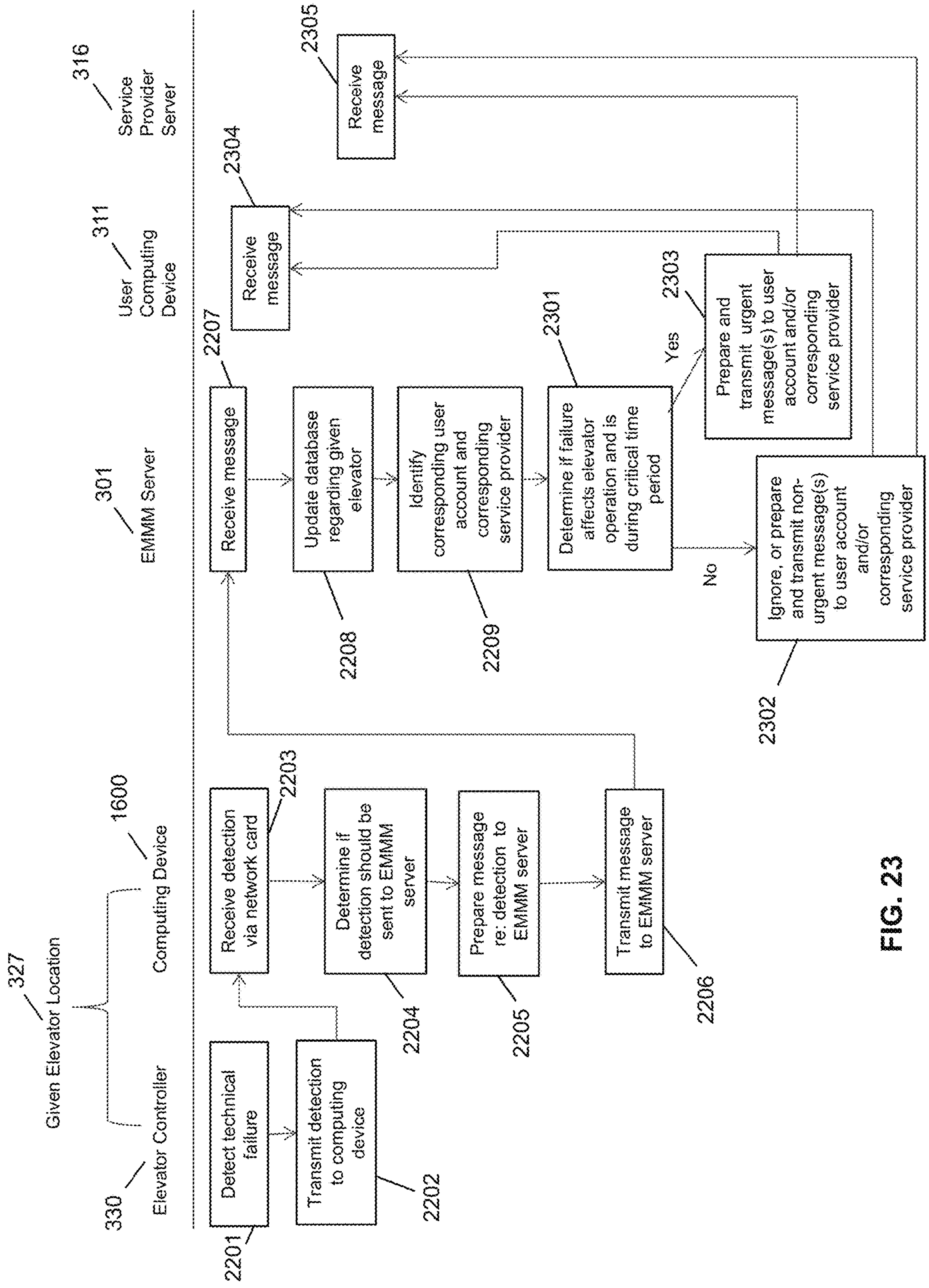
FIG. 23 is a flow diagram of example computer executable instructions for responding to a technical failure of an elevator, in consideration of a critical time period.

FIG. 23 shows example computer executable instructions similar to those in FIG. 23, but the computations consider the critical time period. Operations in blocks 2201 to 2209 are executed. After, at block 2301, the EMMM server determines if the detected failure affects elevator operation during a critical time period. If so, at block 2303, the EMMM server prepares and transmits an urgent message or messages to the user computing device or the service provider server, or both. If not, at block 2302, the EMMM server ignores the message, or prepares and transmits a non-urgent message. The user computing device or the service provider server, or both, receive the messages (blocks 2304 and 2305).

Figure 24:
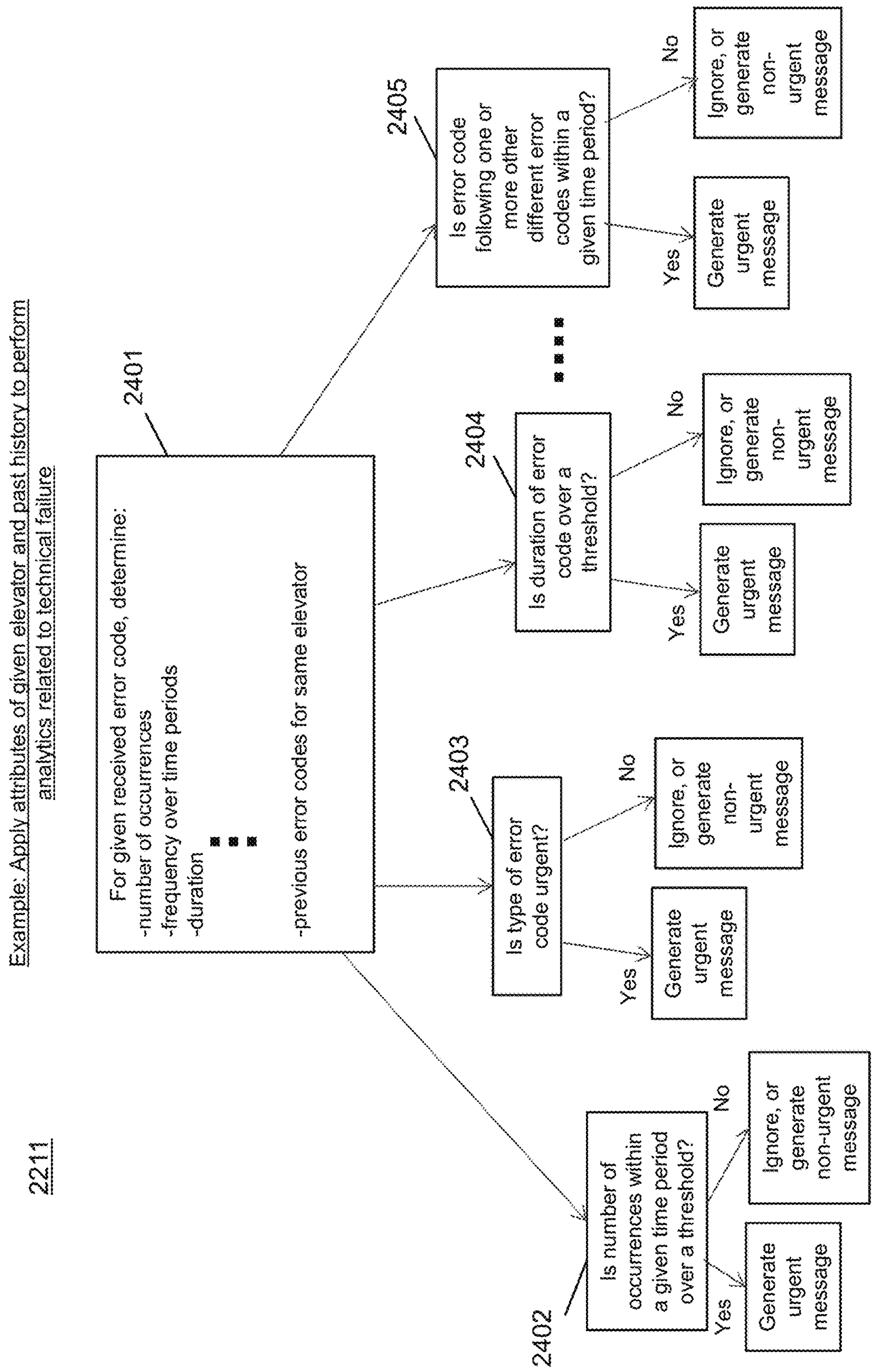
FIG. 24 is a flow diagram of example computer executable instructions for computing analytical algorithms to assess the technical failure.

FIG. 24 shows example computer executable instructions for performing block 2211 to perform analysis of the technical failure.

At block 2401, the EMMM server determines related information about the given error code including: the number of occurrences of the same error code, the frequency of the error code within a given time period, the duration of the error code, and previous error codes for the same elevator. There may be other related information obtained, such as past repairs, related inspection reports and related inspection orders.

At block 2402, the EMMM server determines if the number of occurrences within a given time period is over a threshold. If so, an urgent message is generated.

At block 2403, the EMMM server determines if the type of error code is urgent. If so, an urgent message is generated.

At block 2404, the EMMM server determines if the duration of the error code is over a threshold. If so, an urgent message is generated.

At block 2405, the EMMM server determines if the error code follows one or more different error codes within a given time period. For example, certain combinations of different error codes may reveal an urgent problem, or reveal that the problem is not urgent. If the rule is satisfied, then the EMMM sever generates an urgent message.

It will be appreciated that there may be other rules or conditions that the EMMM server uses to determine whether or not an urgent message should be generated and sent.

FIGS. 25 to 28 show example portions of GUIs generated by the EMMM server.

Figure 25:
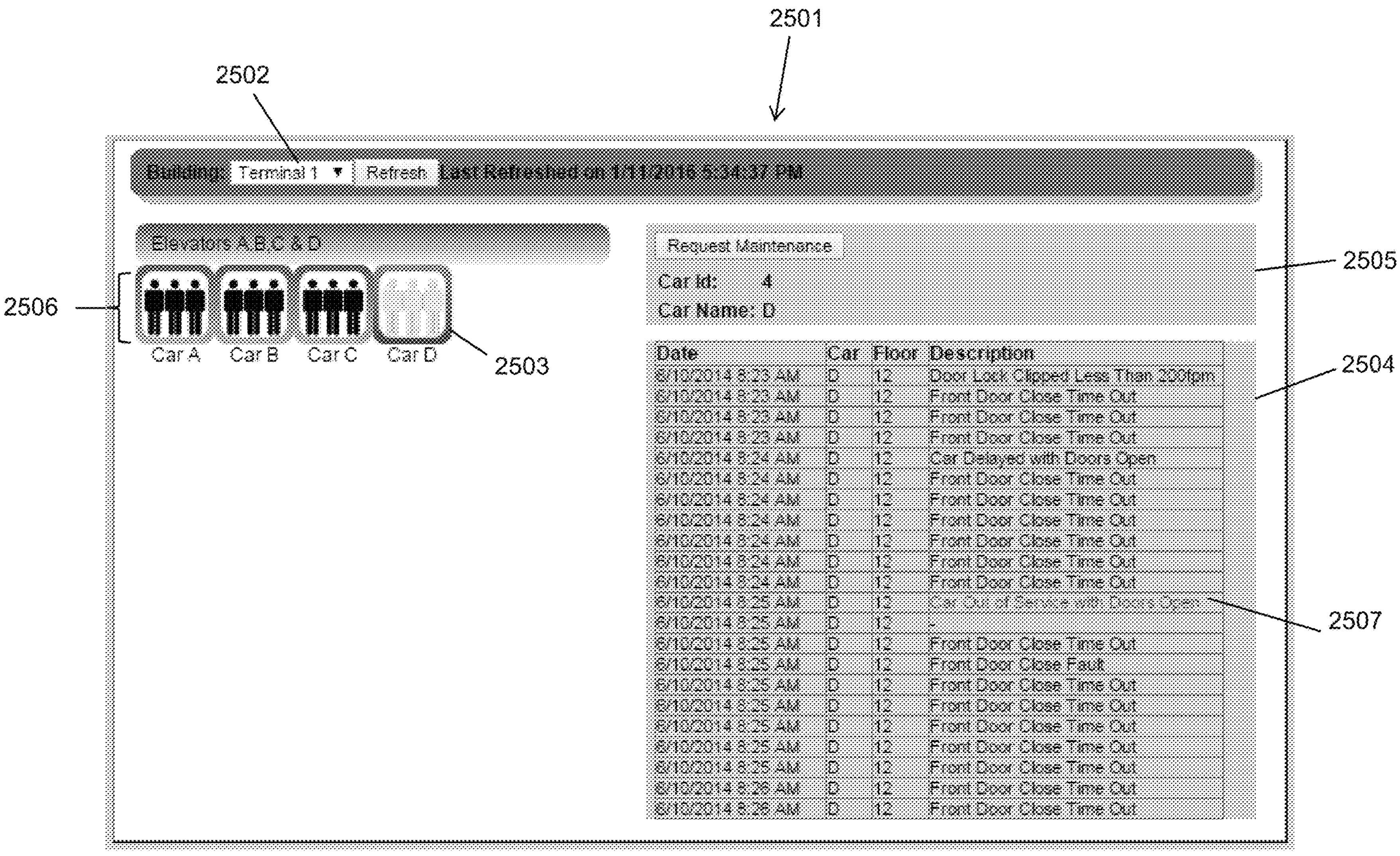
FIG. 25 is a screenshot of an example graphical user interface (GUI) for showing information about elevator cars.

FIG. 25 shows a GUI 2501, or portion thereof, showing details about multiple elevator cars in a building. The control 2502 allows a user to select a certain building. The elevators cars in the selected building are shown as buttons 2506. When one of elevator car buttons are selected, the details of the elevator car are shown in display portions 2505 and 2504. In this example, the button for car D 2503 is shown in a different color or shape to visually indicate that there is an error for car D.

As shown in portion 2505, there is a button that, when selected, initiates automatic compilation of a message to request maintenance of the selected car (e.g. elevator car D). The display, and message should it be compiled, shows the car Id and the car name. The portion 2504 shows a list of events. Each event includes, for example, a date and time stamp, the relevant floor, and the description of the event. The event 2507 in the list that is an error event is shown in a different color or identified by some other visual indicator. For example, the event 2507 indicates that the car is out of service with doors open.

Figure 26:
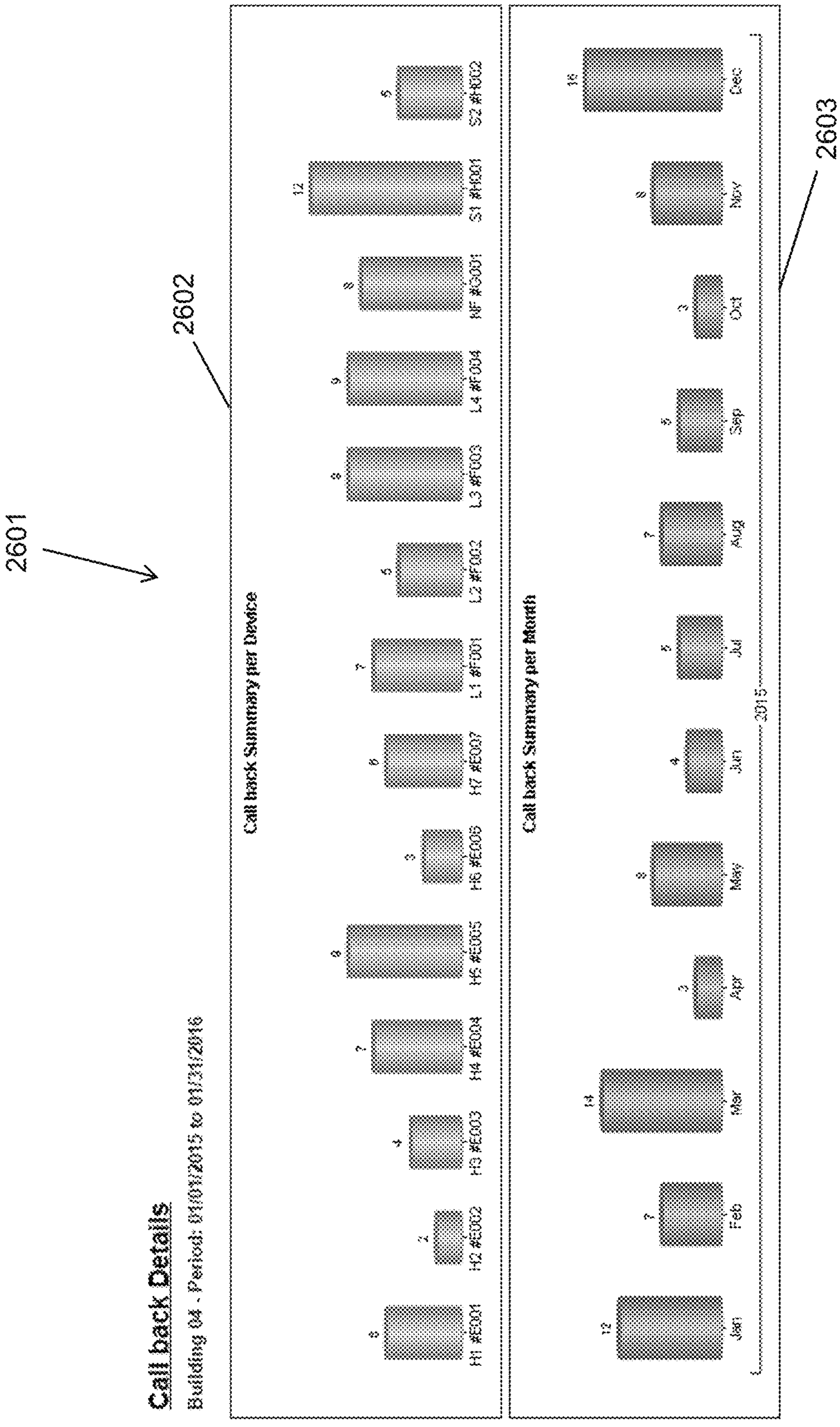
FIG. 26 is a screenshot of an example GUI showing call back details summarized for a facility owner responsible for multiple elevators or escalators, or both.

FIG. 26 shows an example summary of call back details in the GUI 2601, or portion thereof. The GUI includes a graph 2602 showing the number of callbacks made for each lift device. The graph 2603 shows a number of callbacks made per month for all the lift devices belonging to the facility owner.

FIG. 27 shows time period for critical hours and error codes for according to the EMMM format.

FIG. 28 shows a report that includes the history of error codes for a given elevator. For example, elevator H1 #E001 has a total of six call backs: three call backs associated with the ELE error code (e.g. electrical system) and three call backs associated with the GOV error code (e.g. governor/safety). Each error instance shows the date the error code was transmitted, the completion date of the repair, whether or not entrapment occurred, the estimated down time of the given elevator, the description of the error, and the description of the repair.

In an example embodiment, based on the analytics, the EMMM server will automatically recommend repairs, predict maintenance, and identify root problems. These recommendations and automatic analysis may also be presented in the GUI.

FIGS. 29*a* to 29*c*, 30*a*, 30*b*, 31*a*, 31*b* and 32*a* to 32*c* show further examples of XML data from Vendors that is used to encapsulate the maintenance history of an elevating device.

Further example aspects are provided below.

With uniformalization of maintenance and usage data, there is a single sign on. The end user can control callback, allowing the end user to notify different concerned parties, such as owners, service providers, consultants and building tenants, to avoid any unwanted events, as well as send reminders of any kind. Further, uniformalization allows the end user to view information from multiple service providers in one standard presentation, instead of multiple reports in multiple formats. The end user can access information at anytime, providing access to the most recent information on their equipment. Further, information is backed up in the business partner facility. Therefore, the end user can access historical data even after switching service providers. Additionally, backup of data within the business partner's facility provides protection to the end user in the event of a data failure. Having the multiple datasets uniformalized enables the business partner application to analyze datasets, show performance and deficiencies, and send out notifications to the concerned parties.

Other example embodiments and aspects are provided below.

In a general example embodiment, an electronic device, also herein referred to as the field board, is provided for electrically connecting to an elevator controller, the electronic device comprising:

a digital controller;

one or more electrical relay switches, each individually controlled by the digital controller to open or close;

one or more terminal blocks that respectively are electrically connected to the one or more electrical relay switches, and each one of the one or more terminal blocks comprising two electrical contacts that are connectable with two wires of the elevator controller; and a transceiver in communication with the digital controller, the transceiver configured to receive one or more commands to open or close a given electrical relay switch.

In an example aspect, the one or more electrical relay switches comprise a first relay switch that is designated to trigger the elevator controller to move an elevator up, and a second relay switch that is designated to trigger the elevator controller to move the elevator down.

In another example aspect, the electronic device further comprises multiple terminal blocks that are connectable to external electrical relay switches to obtain data about multiple attributes of the elevator controller.

In another example aspect, the multiple terminal blocks comprise a telephone terminal block that obtains data regarding when a telephone in an elevator, which is controlled by the elevator controller, is in use.

In another example aspect, the multiple terminal blocks comprise a running terminal block that obtains data regarding when an elevator, which is controlled by the elevator controller, is running.

In another example aspect, the multiple terminal blocks comprise a shutdown terminal block that obtains data regarding when an elevator, which is controlled by the elevator controller, is shutdown.

In another example aspect, the electronic device further comprises multiple lights that are respectively associated with the multiple electrical relay switches, and each given light indicates an opened state or a closed state of each corresponding given electrical relay switch.

In another example aspect, the electronic device further comprises a temperature sensor to measure ambient temperature of air around the electronic device.

In another general example embodiment, a computing system is provided for electrically controlling an elevator controller, the computing system comprising:

a first electronic device comprising one or more electrical relay switches that are respectively electrically connected to one or more terminal blocks, and the one or more terminal blocks are respectively electrically connectable to the elevator controller;

the first electronic device further comprising a transceiver and a digital controller to control each of the one or more electrical relay switches;

a computing platform device comprising a processor, a memory device, a first transceiver that communicates with the transceiver of the first electronic device, and a network communication device; and the computing platform device configured to receive or generate a command to electrically affect the elevator controller, and subsequently generate and transmit a relay switch command to the first electronic device, and the electronic device is configured to open or close a given electrical relay switch responsive to receiving the relay switch command.

In an example aspect, the first transceiver is connected to the transceiver of the first electronic device via a wire connection.

In another example aspect, the computing platform device is connected to the Internet via the network communication device, and the computing platform device is configured to the command to electrically affect the elevator controller via the network communication device.

In another example aspect, the command to electrically affect the elevator controller includes triggering the elevator controller to call an elevator to a top floor.

In another example aspect, the computing platform device comprises a second transceiver that is in communication with a second electronic device, the second electronic device comprising:

its own electrical relay switches that are respectively electrically connected to its own multiple terminal blocks, and the multiple terminal blocks in the second electronic device are respectively electrically connectable to wires of an ancillary elevator controller;

its own digital controller to control each of the electrical relay switches in the second electronic device; and a transceiver that is in communication with the second transceiver.

In another example aspect, the computing platform device comprises a second transceiver, a third transceiver and a fourth transceiver, each transceiver configured to be in communication with a separate respective electronic device.

In another example aspect, the computing system further comprises the separate respective electronic devices, which comprise: a second electronic device that is electrically connected to a second elevator controller, a third electronic device that is electrically connected to a first escalator controller, and a fourth electronic device that is connected electrically connected to a second escalator controller.

In another example aspect, the computing system further comprises the separate respective electronic devices, which comprise: a second electronic device that is electrically connected to a second elevator controller, a third electronic device that is electrically connected to a third elevator controller, and a fourth electronic device that is connected electrically connected to a fourth elevator controller.

In another example aspect, the computing system further comprises a server system that is in communication with the computing platform device over the Internet, via the network communication device, and the server system generates and sends the command to the computing platform device.

In another example aspect, the server system is configured to monitor an elevator controlled by the elevator controller, and after detecting a predefined time period of inactivity of the elevator, the server system sends the command to the computing platform device.

In another example aspect, the computing platform device is configured to detect if the elevator has moved up and, if not, the computing platform device generates and transmits an alert message indicating a malfunction.

In another general example embodiment, a kit of parts is provided for electrically controlling an elevator controller, the kit of parts comprising:

a first electronic device comprising one or more electrical relay switches that are respectively electrically connected to one or more terminal blocks, and the one or more terminal blocks are respectively electrically connectable to the elevator controller;

the first electronic device further comprising a transceiver and a digital controller to control each of the one or more electrical relay switches;

a computing platform device comprising a processor, a memory device, a first transceiver that communicates with the transceiver of the first electronic device, and a network communication device; and the computing platform device configured to receive or generate a command to electrically affect the elevator controller, and subsequently generate and transmit a relay switch command to the first electronic device, and the electronic device is configured to open or close a given electrical relay switch responsive to receiving the relay switch command.

In another example embodiment of the system and the method, a server (e.g. the EMMM server) obtains code events about a lift device controller via a web services application, the code events being in a first format. The server reformats the code events into a second format using a mapping table, and outputs reformatted code events. The server populates a graphical user interface (GUI) with the reformatted code events, whereby the GUI is accessible by another computing device over the Internet.

In an example aspect, reformatting the code events comprises: selecting a mapping for the code events from a database comprising multiple mappings, the selected mapping selected based on a manufacturer of the lift device, and the database on the server has data restrictions; and converting the code events to match said data restrictions.

In another example aspect, the server receives the code events as part of XML web services data.

In another example aspect, the server obtains data about multiple lift devices associated with a common owner, and the data associated with the multiple lift devices, including the event codes, are shown simultaneously in the GUI.

In another example aspect, the multiple lift devices are located at different locations, and the different locations are shown in the GUI.

In another example aspect, the GUI comprises a control to initiate generating a message, and the operations further include: detecting selection of the control; identifying the lift device currently being selected in the GUI; identifying contact information of a service provider associated with the selected lift device; and automatically compiling the message that includes information about the selected lift device, the message including the contact information.

In another example aspect, automatically compiling the message includes inserting one or more of the event codes associated with the selected lift device.

In another example aspect, the GUI displays information from one or more service providers.

In another example aspect, the operations further include analysing the received event codes to provide an assessment of the lift device.

In another example aspect, the assessment determines an urgency level, and when the urgency level is high, the server sends a message to a user account associated with the lift device.

In another example aspect, the analysing includes comparing the received event codes with past event codes for the same lift device. In another example aspect, the analysing includes identifying a number of the received event codes within a given time period. In another example aspect, the analysing includes identifying a time duration associated with the received event codes. In another example aspect, the assessment includes determining if at least one of the received code events occurred during a critical time period associated with the lift device.

In another example aspect, the operations further include the server receiving an inspection order that includes an identifier of the lift device and a compliance deadline, the inspection order transmittable by a safety monitoring server; in response, the server identifying a user account associated with the lift device; and the server automatically compiling and sending a notification to the user account comprising the inspection order.

In another example aspect, the operations further include the server receiving an input that the inspection order is complete via the GUI; and, in response, the server sending a status message comprising the identifier of the lift device via an application programming interface (API), the status message receivable by the safety monitoring server.

In another example aspect, the lift device is at least one of an elevator and an escalator.

In another general embodiment, a computing process for processing safety data related to one or more lift devices, includes: a server receiving an inspection order via an application programming interface (API) that includes an identifier of a given lift device and a compliance deadline, the inspection order transmittable by a safety monitoring server; in response, the server identifying a user account associated with the given lift device using a database on the server; and the server automatically compiling and sending a notification to the user account comprising the inspection order.

In an example aspect, the server receives an input that the inspection order is complete via a GUI provided by the server; and, in response, the server sends a status message comprising the identifier of the lift device via the API, the status message receivable by the safety monitoring server.

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the servers or computing devices or accessible or connectable thereto. Any application or module herein described may be implemented using computer readable/executable instructions that may be stored or otherwise held by such computer readable media.

It will be appreciated that different features of the example embodiments of the system and methods, as described herein, may be combined with each other in different ways. In other words, different modules, operations and components may be used together according to other example embodiments, although not specifically stated.

The steps or operations in the flow diagrams described herein are just for example. There may be many variations to these steps or operations according to the principles described herein. For instance, the steps may be performed in a differing order, or steps may be added, deleted, or modified.

The GUIs and screen shots described herein are just for example. There may be variations to the graphical and interactive elements according to the principles described herein. For example, such elements can be positioned in different places, or added, deleted, or modified.

Although the above has been described with reference to certain specific embodiments, various modifications thereof will be apparent to those skilled in the art without departing from the scope of the claims appended hereto.

The invention claimed is:

1. A system for monitoring and controlling a lift device, the system comprising:

a digital controller;

at least one sensor that measures at least one aspect of the lift device;

a first processing device in electrical and data communication with the digital controller and the at least one sensor;

a computing device in data communication with the first processing device; and a server system in data communication with the computing device;

wherein the first processing device obtains operational data from the lift device using the at least one sensor and transmits said operational data to the computing device;

the computing device transmits the operational data to the server system;

in response to the operational data, the server system generates and sends one or more commands to the computing device;

the computing device transmits the one or more commands to the first processing device;

the first processing device generates a digital signal to affect the digital controller to control the lift device.

2. The system of claim 1, wherein the first processing device further comprises:

one or more internal electrical relay switches, each individually controlled by the digital controller to open or close;

one or more terminal blocks that respectively are electrically connected to the one or more internal electrical relay switches, and each one of the one or more terminal blocks comprising two electrical contacts that are connectable with two wires of the digital controller; and a transceiver in communication with the digital controller, the transceiver configured to receive the one or more commands to open or close a given internal electrical relay switch;

wherein the one or more internal electrical relay switches are located on the first processing device.

3. The system of claim 2, wherein the one or more internal electrical relay switches comprise a first internal relay switch that is designated to trigger the digital controller to move the lift device up, and a second internal relay switch that is designated to trigger the digital controller to move the lift device down.

4. The system of claim 2, further comprising one or more external electrical relay switches for obtaining data about the digital controller, the one or more external electrical relay switches connected to the one or more terminal blocks of the first processing device;

wherein the one or more external electrical relay switches are external to the first processing device.

5. The system of claim 4, wherein the one or more terminal blocks comprise a telephone terminal block for obtaining data regarding when a telephone in the lift device is in use.

6. The system of claim 4, wherein the one or more terminal blocks comprise a running terminal block for obtaining data regarding when the lift device is running.

7. The system of claim 4, wherein the one or more terminal blocks comprise a shutdown terminal block for obtaining data regarding when the lift device is shutdown.

8. The system of claim 2, further comprising multiple lights that are respectively associated with the one or more internal electrical relay switches, and each given light indicates an opened state or a closed state of each corresponding given internal electrical relay switch.

9. The system of claim 2, wherein the first processing device further comprises a temperature sensor to measure ambient temperature of air around the first processing device.

10. The system of claim 2, wherein the lift device comprises an elevator and an escalator; and the first processing device further comprises a physical switch configured to toggle between an escalator mode and an elevator mode such that the escalator mode can be used for controlling the escalator and the elevator mode can be used for controlling the elevator.

11. The system of claim 1, wherein the computing device comprises a second transceiver in communication with a second processing device, the second processing device comprising:

Its own one or more internal electrical relay switches that are respectively electrically connected to its own one or more terminal blocks, and the one or more terminal blocks in the second processing device are electrically connectable to wires of an ancillary elevator controller;

Its own digital controller to control each of the one or more internal electrical relay switches in the second processing device; and a transceiver in communication with the second transceiver;

wherein the second processing device is configured to be in communication with at least one sensor to monitor a second lift device; and wherein the one or more internal electrical relay switches are located on the second processing device.

12. The system of claim 1, wherein the computing device further comprises a second transceiver, a third transceiver and a fourth transceiver, each transceiver configured to be in communication with a separate respective processing device configured to be in communication with at least one sensor to monitor a second, a third and a fourth lift device.

13. The system of claim 12, further comprising the separate respective processing device, which comprise: a second processing device that is electrically connected to a second digital controller, a third processing device that is electrically connected to a third digital controller, and a fourth processing device that is electrically connected to a fourth digital controller.

14. A method of monitoring and controlling a lift device, the method comprising:

connecting a digital controller to at least one sensor located in and around the lift device for monitoring at least one aspect of the lift device;

connecting a first processing device to the digital controller and the at least one sensor;

connecting a computing device to the first processing device;

connecting a server system to the computing device;

obtaining operational data from the lift device using the at least one sensor;

transmitting the operational data to the computing device;

transmitting the operational data from the computing device to the server system;

analyzing the operational data compared to predetermined standards, and based on the analysis, the server system to generates and sends one or more commands to the computing device;

transmitting the one or more commands from the computing device to the first processing device; and affecting the digital controller to control the lift device as a result of a digital signal generated from the first processing device.

15. The method of claim 14, wherein the first processing device comprises one or more internal electrical relay switches that are respectively electrically connected to one or more terminal blocks, and the one or more terminal blocks are respectively electrically connected to the digital controller;

the first processing device further comprising a first transceiver; and the computing device further comprising a processor, a memory device, a second transceiver that communicates with the first transceiver, and a network communication device;

the computing device configured to receive or generate a command to electrically affect the digital controller, and subsequently generate and transmit a relay switch command to the first processing device, and the first processing device is configured to open or close a given internal electrical relay switch responsive to receiving the relay switch command.

16. The method of claim 15, wherein the second transceiver is connected to the first transceiver via a wire connection.

17. The method of claim 15, wherein the computing device is connected to the Internet via the network communication device, and the affecting step further comprises configuring the computing device to electrically affect the digital controller via the network communication device.

18. The method of claim 14, wherein the affecting step further comprises generating a command to electrically affect the digital controller by triggering the digital controller to call the lift device up or down.

19. The method of claim 14, wherein the server system is in communication with the computing device over the Internet, via a network communication device.

20. The method of claim 19, wherein the server system is configured to monitor the lift device controlled by the digital controller, and after detecting a predefined time period of inactivity of the lift device, the server system sends a command to the computing device.

21. The method of claim 18, wherein the computing device is configured to detect if the lift device has moved up and, if not, the computing device generates and transmits an alert message indicating a malfunction.

* * * * *